(12) United States Patent
Crawford

(10) Patent No.: US 10,906,172 B2
(45) Date of Patent: Feb. 2, 2021

(54) LINEAR DELTA SYSTEMS, HEXAPOD SYSTEMS, AND RELATED METHODS

(71) Applicant: Battelle Energy Alliance, LLC, Idaho Falls, ID (US)

(72) Inventor: Anthony L. Crawford, Rigby, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 109 days.

(21) Appl. No.: 16/191,135

(22) Filed: Nov. 14, 2018

(65) Prior Publication Data

US 2020/0147784 A1    May 14, 2020

(51) Int. Cl.
*B25J 9/10* (2006.01)
*B25J 9/00* (2006.01)
*F16H 21/54* (2006.01)
*B25J 5/00* (2006.01)
(Continued)

(52) U.S. Cl.
CPC .................. *B25J 9/10* (2013.01); *B25J 5/007* (2013.01); *B25J 5/04* (2013.01); *B25J 9/0051* (2013.01); *B25J 9/06* (2013.01); *F16H 21/54* (2013.01)

(58) Field of Classification Search
CPC ....... B25J 5/007; B25J 5/04; B25J 5/06; B25J 9/003; B25J 9/0051; B25J 9/02; B25J 9/023; B25J 9/04; B25J 9/06; B25J 9/10; B25J 18/00
See application file for complete search history.

(56) References Cited

U.S. PATENT DOCUMENTS

| 4,652,204 A * | 3/1987 | Arnett ...................... B25J 5/007 212/901 |
| 5,378,282 A | 1/1995 | Pollard |
| 6,047,610 A | 4/2000 | Stocco et al. |

(Continued)

FOREIGN PATENT DOCUMENTS

| CN | 106737600 A | 5/2017 |
| CN | 107009350 A | 8/2017 |

(Continued)

OTHER PUBLICATIONS

International Search Report from International Application No. PCT/US19/061243, dated Mar 19, 2020, 3 pages.
(Continued)

*Primary Examiner* — Prasad V Gokhale
(74) *Attorney, Agent, or Firm* — TraskBritt

(57) ABSTRACT

A linear delta system includes a support frame, rails mounted to the support frame, linear actuators, each linear actuator configured to translate along a longitudinal length of a respective rail, pairs of parallel rods each coupled to the linear actuators, a platform coupled to a longitudinal end of each of the pairs of parallel rods opposite the respective linear actuator, and an object coupled to the platform. Longitudinal axes of the rails are oriented parallel to each other and lie within a common plane or an uncommon plane. A method of forming a linear delta system includes mounting rails to a support frame, the rails having longitudinal axes that are parallel to each other and lying within a common plane, coupling a linear actuator to each of the rails, coupling a pair of parallel rods to each linear actuator, and coupling a platform to the pairs of parallel rods.

16 Claims, 18 Drawing Sheets

(51) Int. Cl.
 *B25J 5/04* (2006.01)
 *B25J 9/06* (2006.01)

(56) References Cited

U.S. PATENT DOCUMENTS

| | | | |
|---|---|---|---|
| 6,099,217 A * | 8/2000 | Wiegand | B23Q 1/5462 408/234 |
| 6,497,548 B1 | 12/2002 | Roy et al. | |
| 6,516,681 B1 * | 2/2003 | Pierrot | B25J 17/0266 74/490.01 |
| 6,974,297 B2 * | 12/2005 | Brogårdh | B23Q 1/5462 414/680 |
| 6,979,932 B2 | 12/2005 | Hamann et al. | |
| 7,124,660 B2 | 10/2006 | Chiang | |
| 7,331,750 B2 | 2/2008 | Merz et al. | |
| 8,839,690 B2 | 9/2014 | Huang et al. | |
| 9,566,708 B2 | 2/2017 | Kurnianto | |
| 10,071,478 B2 * | 9/2018 | Houston | B25J 9/0042 |
| 2004/0028516 A1 | 2/2004 | Brogardh | |
| 2004/0037663 A1 | 2/2004 | Zarske | |
| 2004/0052628 A1 | 3/2004 | Thurneysen et al. | |
| 2010/0263471 A1 | 10/2010 | Weber | |
| 2011/0097184 A1 | 4/2011 | Kinoshita et al. | |
| 2011/0120253 A1 | 5/2011 | Tara et al. | |
| 2011/0154936 A1 | 6/2011 | Zhao et al. | |
| 2013/0017050 A1 | 1/2013 | Fukudome et al. | |
| 2014/0060234 A1 | 3/2014 | Uemura | |
| 2014/0083231 A1 | 3/2014 | Sutherland | |
| 2014/0150591 A1 | 6/2014 | Yang | |
| 2014/0331806 A1 | 11/2014 | Nagatsuka | |
| 2014/0338489 A1 * | 11/2014 | Peng | B25J 17/0266 74/490.03 |
| 2014/0360306 A1 | 12/2014 | Mihara et al. | |
| 2015/0176754 A1 | 6/2015 | Houston et al. | |
| 2015/0343631 A1 | 12/2015 | Martinez-Esponda | |
| 2016/0096329 A1 | 4/2016 | Ko et al. | |
| 2016/0332296 A1 | 11/2016 | Kumianto | |
| 2017/0050278 A1 | 2/2017 | Jaster | |
| 2017/0144379 A1 | 5/2017 | Sung et al. | |
| 2017/0167659 A1 | 6/2017 | Hwang et al. | |
| 2018/0085913 A1 | 3/2018 | Ilch | |
| 2019/0061144 A1 | 2/2019 | Yamamoto | |
| 2019/0118378 A1 | 4/2019 | Ludban | |
| 2019/0210220 A1 | 7/2019 | Wu | |
| 2019/0275669 A1 | 9/2019 | Matsushita et al. | |
| 2019/0329429 A1 | 10/2019 | Yamamoto | |

FOREIGN PATENT DOCUMENTS

| | | |
|---|---|---|
| CN | 107486843 A | 12/2017 |
| CN | 108465803 A | 8/2018 |
| EP | 2821186 A3 | 5/2015 |
| JP | 2009-297793 A | 12/2009 |
| JP | 2006-082157 | 8/2012 |
| KR | 10-2014-0122493 A | 10/2014 |
| WO | 20151115887 A1 | 8/2015 |

OTHER PUBLICATIONS

International Written Opinion from International Application No. PCT/US19/061243, dated Mar 19, 2020, 5 pages.

Williams II, "The Delta Parallel Robert: Kinematics Solutions", Internet Publication, www.ohio.edu/people/williar4/html/pdf/DeltaKin.pdf, (Jan. 2016) 46 pages.

Stan et al., "Evolutionary Approach to Optimal Design of 3 DOF Translation Exoskeleton and Medical Parallel Robots", 2008 Conference on Human System Interactions, Krakow, Poland (May 2008) pp. 720-725.

Oberhauser, "Design, Construction, Control, and Analysis of Linear Delta Robot", thesis presented to the faculty of the Russ College of Engineering and Technology of Ohio University (Apr. 2016) 136 pages.

International Search Report for Application No. PCT/US19/61222, dated May 7, 2020, 4 pages.

International Written Opinion for Application No. PCT/US19/61222, dated May 7, 2020, 8 pages.

* cited by examiner

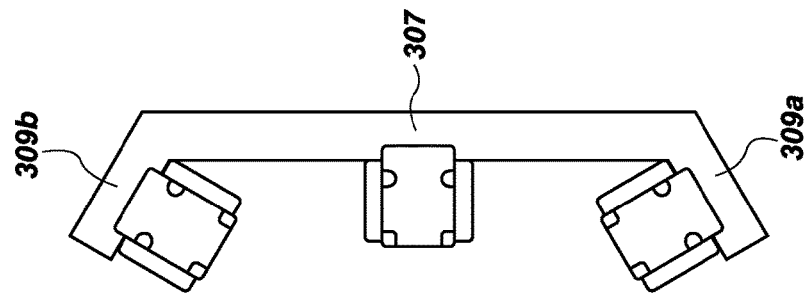
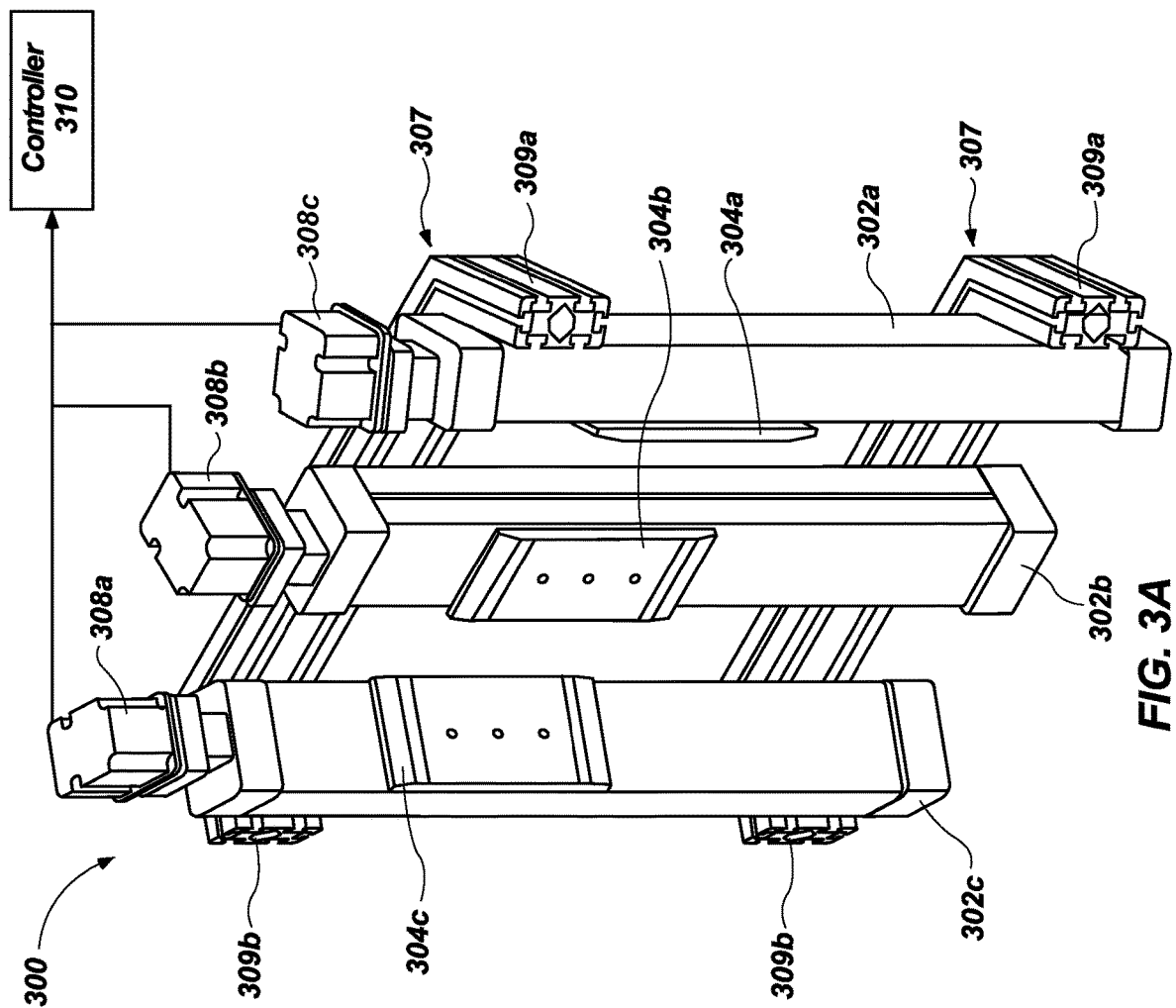

LINEAR DELTA SYSTEMS, HEXAPOD SYSTEMS, AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

CROSS-REFERENCE TO RELATED APPLICATIONS

The subject matter of application is related to the subject matter of U.S. patent application Ser. No. 16/191,047, filed Nov. 14, 2018, titled "LINEAR DELTA SYSTEMS WITH ADDITIONAL DEGREES OF FREEDOM AND RELATED METHODS" by inventor Anthony L. Crawford, and to the subject matter of U.S. patent application Ser. No. 16/191,093, filed Nov. 14, 2018, titled "DUAL LINEAR DELTA ASSEMBLIES, LINEAR DELTA SYSTEMS, AND RELATED METHODS" by inventor Anthony L. Crawford, the disclosure of each of which is hereby incorporated herein in its entirety by this reference.

TECHNICAL FIELD

This disclosure relates generally to linear delta systems, hexapod systems, and related methods. In particular, this disclosure relates to linear delta and linear hexapod robots having relatively compact configurations and particularly suited, without limitation, for mobile applications.

BACKGROUND

Delta and hexapod robots (e.g., parallel robots) are utilized in many applications involving material handling, additive manufacturing, human-systems interaction, medical robots, rehabilitation, exoskeletons, radiological environments, nuclear fuel testing, etc. The foregoing applications typically require robust precision and dynamic workspace computation. Delta platforms and hexapod platforms typically provide three degrees of freedom and six degrees of freedom while yielding a relatively small workspace to robot size ratio. Furthermore, in many instances, the workspace is otherwise inaccessible due to surrounding required support framing. Such limitations hinder the abilities and applications of these parallel robots. Furthermore, when additional degrees of freedom are imparted conventionally to the delta robots via additional systems, the systems typically involve placing additional drive units (e.g. motors) and associated electronics and linkages on the load path (e.g., on a platform (i.e., on an end effector platform)) of the delta robots. As a result of this additional mass, inertia is increased when components are moved along the load path. The increased cross-sectional area and inertia hinders a delta robot's abilities in under water and relatively higher speed applications. For instance, in underwater applications and/or radiological environments, the drive units (e.g., motors) and any electronics associated with the drive unit require relatively high inertia protection (e.g. shielding and/or sealing) because the drive unit masses are located on the load path (e.g., exposed to the environment). Furthermore, the added drive units and associated electronics and linkages result in added water shear and drag when moving the platform and other objects (e.g. the aforementioned additional mass). Moreover, delta robots are not typically capable of rapid translation of any significant distance in any one direction. Again, the foregoing issue severely limits the applications of delta robots. Additionally, conventional delta robots are typically limited in their working space, relative to size, and require significant framing to support and operate the delta robots. These conditions results in a relatively large system size which limits the system's capability to be employed in mobile or space constrained applications.

BRIEF SUMMARY

One or more embodiments of the present disclosure includes a system, including: a support frame. The system also includes rails mounted to the support frame, where longitudinal axes of the rails are oriented parallel to each other and lie within a common plane. The system also includes linear actuators, each linear actuator coupled to a respective rail of the rails and configured to translate along a longitudinal length of the respective rail. The system also includes pairs of parallel rods each operably coupled to a respective linear actuator of the linear actuators. The system also includes a platform coupled to a longitudinal end of each of the pairs of parallel rods opposite the respective linear actuator.

Some embodiments of the present disclosure include a system, including: a support frame. The system also includes rails mounted to the support frame; extension assemblies, each extension assembly coupled to a respective rail of the rails and configured to translate along a longitudinal length of the respective rail, where each extension assembly includes: an upper linear bearing movably coupled to a rail of the rails via a linear actuator and an extension rail coupled to the upper linear bearing. The system also includes cantilever rails coupled to longitudinal ends of the extension rails of the extension assemblies; pairs of parallel rods each operably coupled to a respective cantilever rail of the cantilever rails, and a platform coupled to a longitudinal end of each of the pairs of parallel rods opposite the respective cantilever rail.

One or more embodiments of the present disclosure includes a method of forming a system, the method including: mounting rails to a support frame, the rails having longitudinal axes that are parallel to each other and lying within a common plane; coupling a linear actuator to each of the rails; coupling a pair of parallel rods to each linear actuator; and coupling a platform to the pairs of parallel rods.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein:

FIG. 3A is a perspective view of an actuator bank of a linear delta system according to one or more additional embodiments of the present disclosure;

FIG. 3B is a top view of the actuator bank of FIG. 3A;

DETAILED DESCRIPTION

Figure 1A:
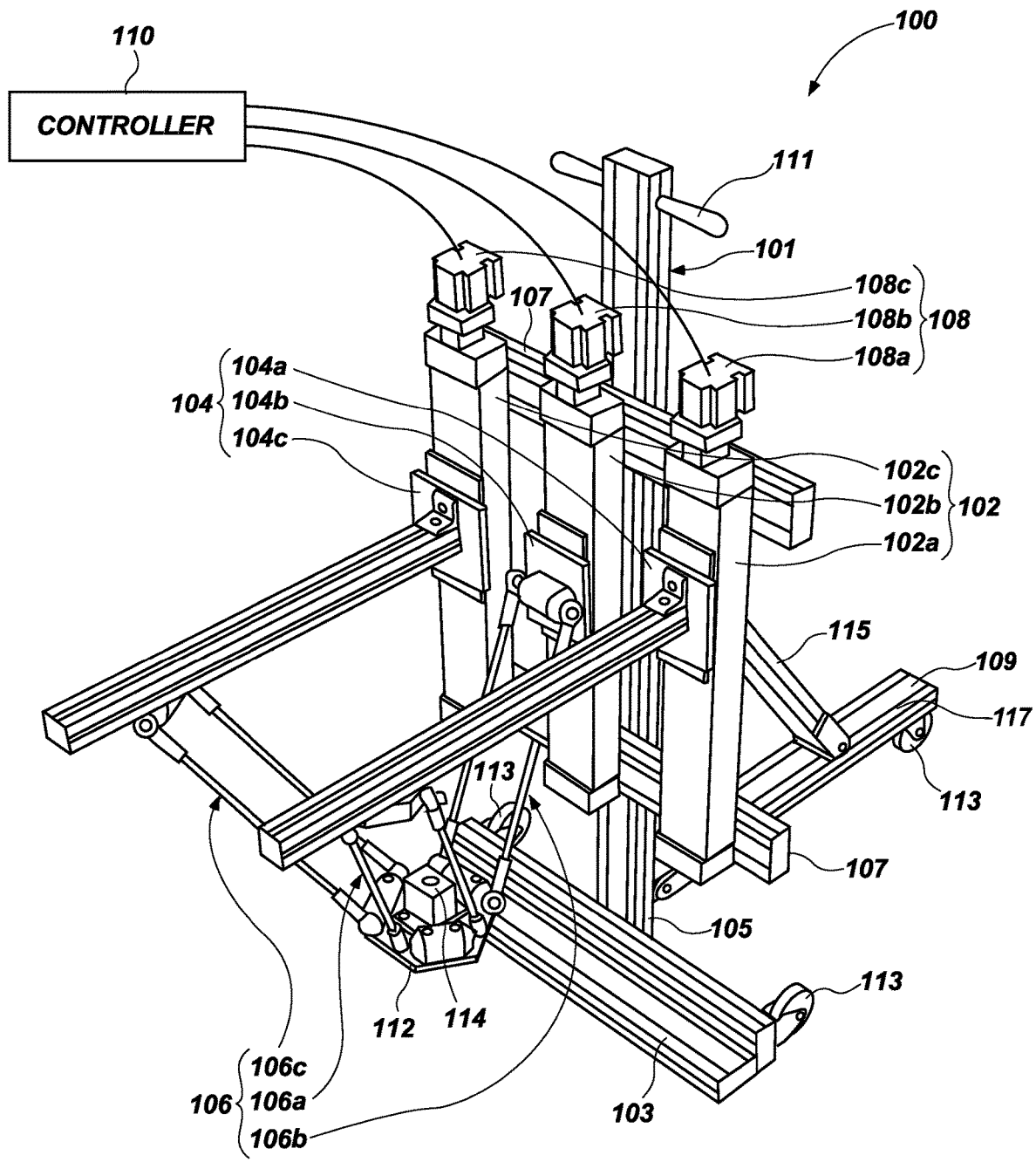
FIG. 1A shows a perspective view of a linear delta system according to one or more embodiments of the present disclosure.

The illustrations presented herein are not actual views of any linear delta system, hexapod system, or any component thereof, but are merely idealized representations, which are employed to describe the present invention.

As used herein, any relational term, such as "first," "second," "top," "bottom," "upper," "lower," "above," "beneath," "side," "horizontal," "vertical," "lateral," etc., is used for clarity and convenience in understanding the disclosure and accompanying drawings, and does not connote or depend on any specific preference or order, except where the context clearly indicates otherwise. For example, these terms may refer to an orientation of elements of a linear delta system or hexapod system when utilized in a conventional manner. Furthermore, these terms may refer to an orientation of elements of a linear delta system or a hexapod system when as illustrated in the drawings.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

FIG. 1A shows a perspective view of a linear delta system 100 (i.e., a linear delta robot and/or modified linear delta system) according to one or more embodiments of the present disclosure. The linear delta system 100 may include a support frame 101, a plurality of rails 102a, 102b, 102c (referred to collectively with the reference numeral 102), a plurality of linear actuators 104a, 104b, 104c (e.g., carriages; referred to collectively with the reference numeral 104), a plurality of pairs of parallel rods 106a, 106b, 106c (referred to collectively with the reference numeral 108), a plurality of drive units 108a, 108b, 108c, a controller 110, a platform 112, and an object 114 of interest.

Figure 1D:
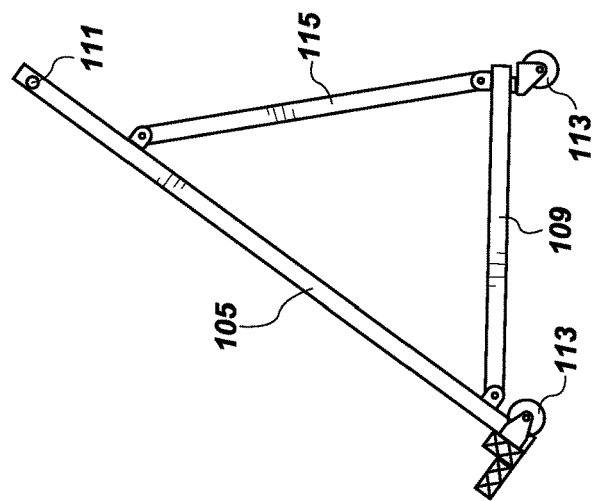
FIGS. 1B-1D show various views of a support frame of the linear delta system of FIG. 1A according to one or more embodiments of the present disclosure.
Figure 1C:
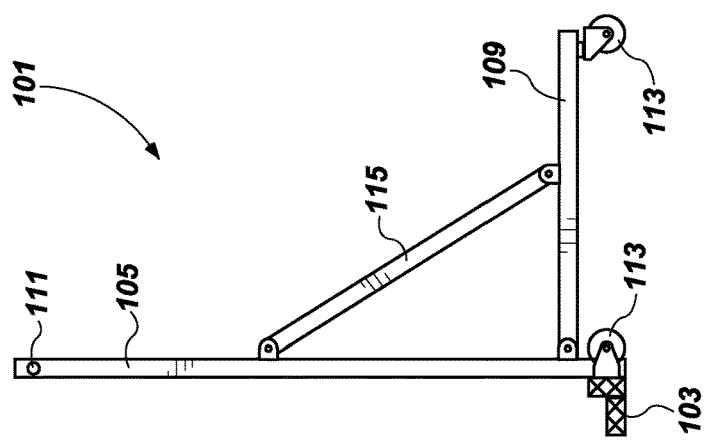
Figure 1B:
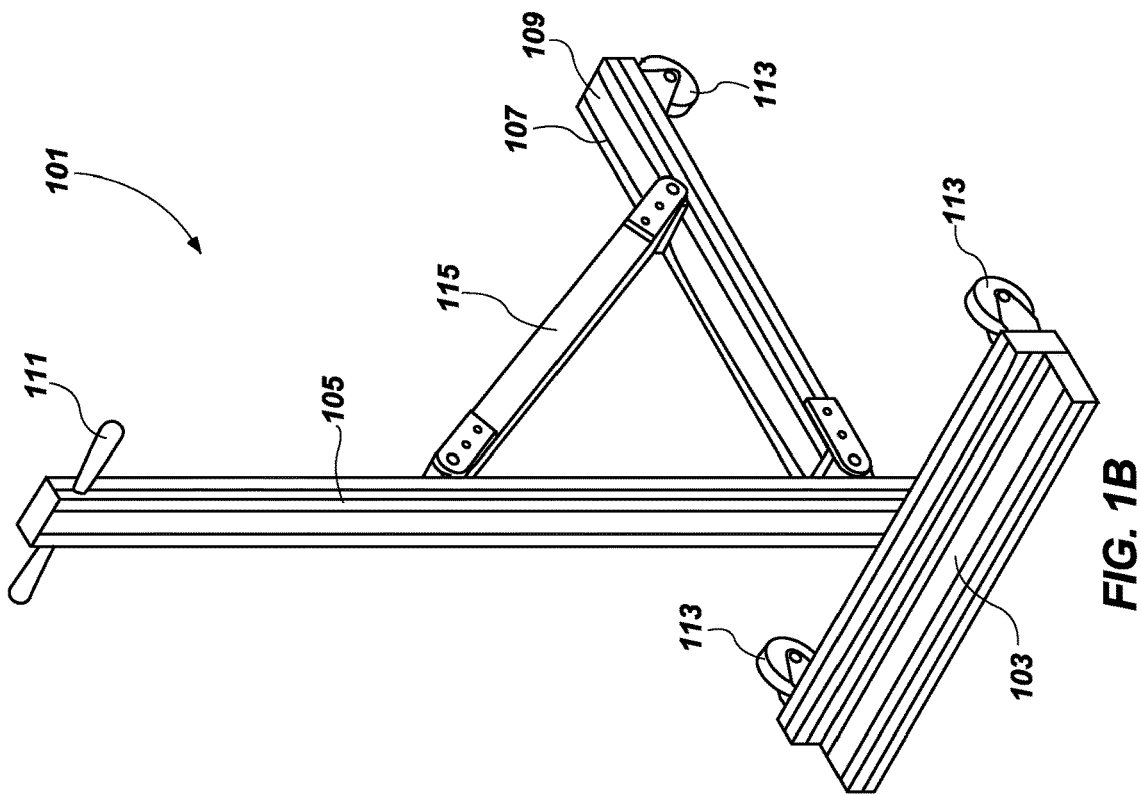

FIG. 1B is a perspective view of the support frame 101 of the linear delta system 100. FIG. 1C is a side view of the support frame 101 of the linear delta system 100 in an operating position. FIG. 1D is a side view of the support frame 101 of the linear delta system 100 in a folded position. The foregoing orientations are described in further detail below.

Referring to FIGS. 1A-1D together, the support frame 101 may include a first base member 103, a support member 105, a plurality of cross members 107 (FIG. 1A), a second base member 109, a handle member 111, a plurality of wheels 113, and a brace member 115. The first base member 103 may extend longitudinally in an at least substantially horizontal direction and may be sized and shaped to rest against a flat surface (e.g., a ground surface) upon which the linear delta system 100 (e.g., the support frame 101) may be disposed. One or more wheels of the plurality of wheels 113 may be mounted to the first base member 103 and may, when the first base member 103 is tilted, allow the first base member 103 to be supported on the one or more wheels 113 and to roll along the flat surface. For instance, the first base member 103 may include a rail having a general L-shaped cross-section and may include a short leg of an L-shape and a long leg of the L-shape. The long leg of the L-shape being intended to lay against the flat surface (e.g., ground surface), and the one or more wheels 113 may be mounted to a short leg of the L-shape, as depicted in FIGS. 1C and 1D. As a result, the first base member 103 may be tilted up onto the one or more wheels 113, as described in further detail in regard to FIG. 1D.

The support member 105 may be attached to the short leg of the L-shape of the first base member 103 and may extend longitudinally upward from the first base member 103. For example, the support member 105 may extend longitudinally in a direction at least substantially perpendicular to a direction in which the first base member 103 extends longitudinally. As a non-limiting example, the support member 105 may extend in a vertical direction, and the first base member 103 may extend longitudinally in a horizontal direction. The plurality of cross members 107 may be mounted to the support member 105 above the first base member 103, may extend in horizontal directions, and may be at least substantially centered on the support member 105.

The second base member 109 may be rotatably coupled to the support member 105. In some embodiments, the second base member 109 may be rotatably coupled to the support member 105 proximate a bottom longitudinal end of the support member 105. For example, the second base member 109 may be rotatably coupled to the support member 105 via a hinge. As a result, as shown in FIG. 1D the support member 105, and the first base member 103 (and, as a result, a remainder of the linear delta system 100) may be rotatable relative the second base member 109. At least one wheel 113 of the plurality of wheels 113 may be attached to the second base member 109. In some embodiments, the at least one wheel 113 may be disposed beneath the second base member 109 such that the second base member 109 is suspended above any flat surface (e.g., ground surface) upon which the linear delta system 100 may be placed (e.g., rest). In view of the foregoing, when the first base member 103 is titled up onto the one or more wheels 113, the entire support frame 101 (and at least some portions of the linear delta system 100) may be supported by the plurality of wheels 113 and may be moved around on the plurality of wheels 113 (e.g., mobile).

In one or more embodiments, the brace member 115 may be rotatably coupled to the support member 105 at a location above the second base member 109 and may be configured to extend between the support member 105 and the second base member 109. For instance, the brace member 115, the second base member 109, and the support member 105 may form a general right triangle when the support frame 101 and the linear delta system 100 is in an operating position (e.g., a default operating position) (as described below). Additionally, the brace member 115 may have one or more locked positions. For instance, the brace member 115 may be configured to hold the support member 105 in a vertical position in a first locked position. The first locked position may correlate to an operating position of the linear delta system 100 (i.e., a position in which the linear delta system 100 is intended to operate, as is discussed in greater detail below). Additionally, the brace member 115 may be configured to hold the support member 105 in a tilted orientation in a second locked position. The second locked position may correlate to a folded position of the linear delta system 100 (i.e., a position wherein the first base member 103 is tilted on to its wheels 113 and the support member 105 is oriented at an acute angle relative to the second base member 109. Furthermore, between the first locked position and the second locked position, the brace member may be configured to move freely. For example, the second base member 109 may include one or more guide channels 117 formed in an upper surface of the second base member 109 and extending along the longitudinal length of the second base member 109, and the support member 105 may include one or more guide channels 117 formed in the surface of the support member 105 facing the brace member 115. The brace member 115 may be engaged with the one or more guide channels 117. Furthermore, the second base member 109 may be slidable along the one or more guide channels 117 between the first and second locked positions (e.g., between the operating and folded positions of the linear delta system 100). The operating and folded positions are described in further detail in regard to FIGS. 1C and 1D.

As noted above, FIG. 1D is a schematic side view of the support frame 101 of the linear delta system 100 of FIGS. 1A-1C in a folded position. As shown, to achieve a folded position, the first base member 103, the support member 105, and as a result, the plurality of rails 102, the plurality of linear actuator assemblies 104, the pairs of parallel rods 106, the platform 112, and the handle member 111 may all be tilted relative to the second base member 109. By tilting the first base member 103 and the other previously mentioned elements, the first base member 103 may be lifted off of any flat surface (e.g., a ground surface) that the first base member 103 may have been resting upon, and the first base member 103 and the other previously mentioned elements may be at least partially supported by the plurality of wheels 113 mounted to the first base member 103. Furthermore, the support member 105 may be oriented at an acute angle relative to the second base member 109, and the brace member 115 may be used to support the support member 105 and other elements of the linear delta system 100 in the folded position. For instance, in some embodiments, the brace member 115 may be lockable in place relative to the support member 105 and/or the second base member 109.

As a result of the foregoing, the entire support frame 101, and elements of the linear delta system 100 attached to the support frame 101, may be supported by the plurality of wheels 113 mounted to the first base member 103 and the second base member 109. Accordingly, in the folded position, the support frame 101, and as a result, the linear delta system 100 may be relatively easily moved from location to location. In other words, in the folded position, the linear delta system 100 may be relatively mobile. Furthermore, any embodiments described herein in regard to FIGS. 2-12 may include the support frame 101 described in regard to FIGS. 1A-1D and the mobility described herein.

The handle member 111 may be attached to the support member 105 proximate a top longitudinal end of the support member 105. Furthermore, the handle member 111 may provide a handle to an operator to assist the operator in moving the support frame 101 and the linear delta system 100 on the plurality of wheels 113 or transitioning the support frame 101 and the linear delta system 100 from the folded position to the operating position or from the operating position to the folding position. In some embodiments, the handle member 111 may include two posts extending outward from lateral sides of the support member 105.

The plurality of rails 102a, 102b, 102c, the plurality of linear actuators 104a, 104b, 104c, the plurality of pairs of parallel rods 106a, 106b, 106c, the platform 112, and the object 114 of interest are described in detail below in regard to FIGS. 2-12.

Furthermore, although the support frame 101 is described herein in conjunction with a linear delta platform, the disclosure is not so limited. Rather, the support frame 101 may be applicable to other systems such as hexapod systems, as is described in greater detail below.

Figure 2:
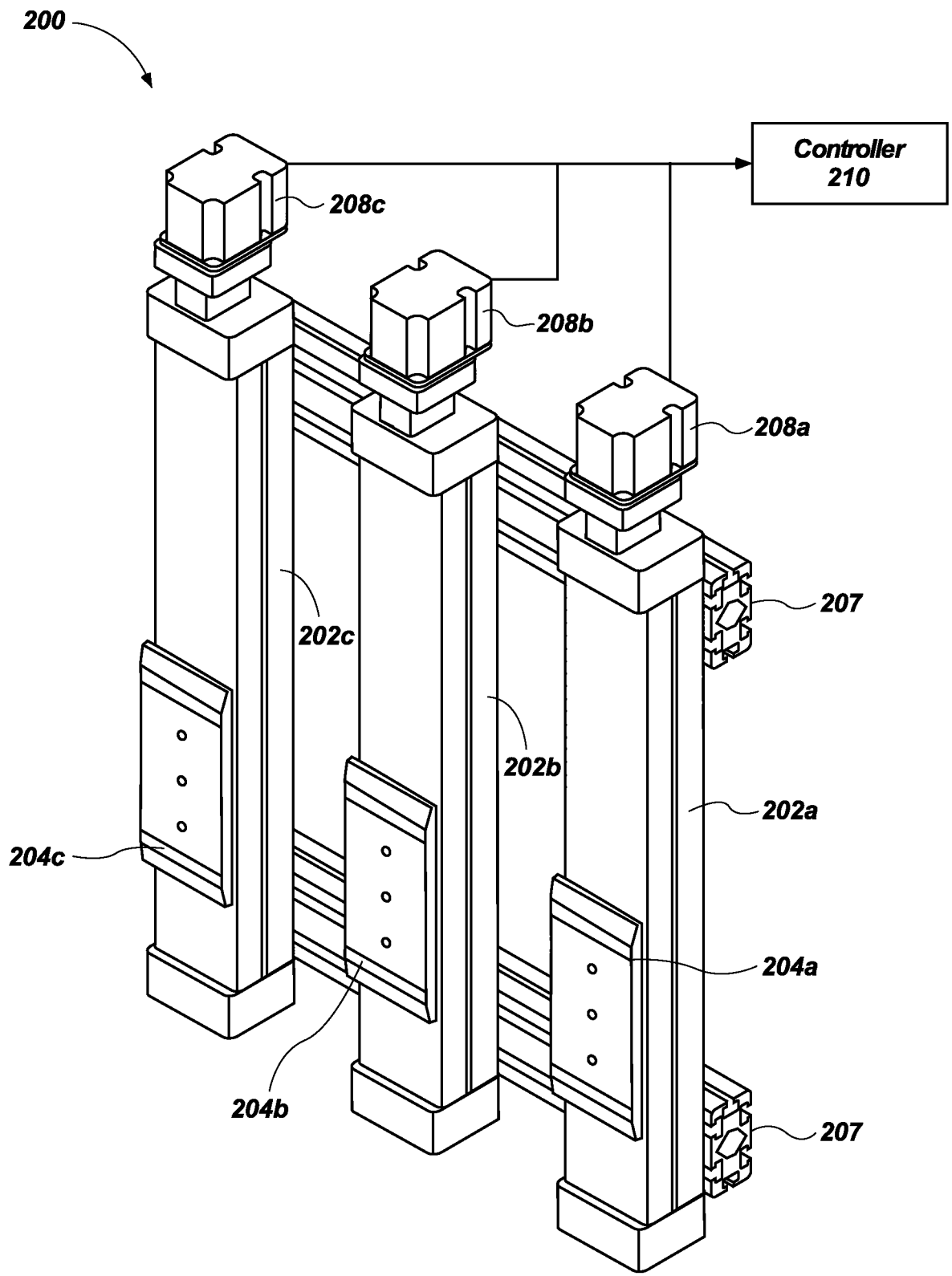
FIG. 2 is a perspective view of an actuator bank of a linear delta system according to one or more embodiments of the present disclosure.

FIG. 2 shows a perspective view of an actuator bank 200 of a linear delta system (e.g., linear delta system 100) according to one or more embodiments of the present disclosure. For instance, FIG. 2 shows the actuator bank 200 depicted in FIG. 1A. Referring to FIGS. 1A and 2 together, in some embodiments, the actuator bank 200 may include the plurality of rails 202a, 202b, 202c (referred to collectively with the reference numeral 202), the plurality of linear actuators 204a, 204b, 204c (e.g., carriages) (referred to collectively with the reference numeral 204), the plurality of drive units 208a, 208b, 208c (referred to collectively with the reference numeral 208), the cross members 207, and the controller 210.

In one or more embodiments, the plurality of rails 202 may be mounted to the plurality of cross members 207.

Furthermore, as discussed above in regard to FIG. 1A, the plurality of cross members 207 may be mounted to the support member 105 (FIG. 1A) of the support frame 101 (FIG. 1A) above the first base member 103 (FIG. 1A). Additionally, when the actuator bank 200 is mounted to the support frame 101 (FIG. 1A) and the support frame 101 (FIG. 1A) is in the operating position, the plurality of rails 202 may extend in an at least a substantially vertical direction. Furthermore, center longitudinal axes of the plurality of rails 202 may be parallel to each other and may each lie within a common plane. For example, the center longitudinal axes may extend within a common plane. As another non-limiting example, the plurality of rails 202 may be oriented adjacent to each other in a line Each linear actuator (e.g., linear actuator 204a) may be movably coupled to a respective rail (e.g., rail 202a) of the plurality of rails 202. Furthermore each linear actuator (e.g., 204a) may be configured to translate along (e.g., back and forth along, up and down along, etc.) a longitudinal length of a respective rail 202. In some embodiments, the movement (e.g., translation) of the linear actuators 204a, 204b, 204c may be controlled and operated by the plurality of drive units 208a, 208b, 208c and the controller 210 via conventional manners. The plurality of drive units 208, depicted herein mounted to tops of the plurality of rails 202, may be disposed at any location able to operate the plurality of rails 202. In one or more embodiments, the plurality of drive units 208 may each include a motor (e.g., electric motor) operably coupled to the controller 210 and a lead screw to which a respective linear actuator is movably coupled. The motor may rotate the lead screw which, in turn, may cause the linear actuator 204 to translate up or down along the lead screw and up or down the respective rail 202. In further embodiments, each drive unit may include gears and/or pulleys for extending and retracting chains and/or timing belts attached to a respective linear actuator 204.

The controller 210 may be configured to operate the actuator bank 200. Furthermore, controller 210 may be configured to provide graphical data to a display for presentation to the operator. The graphical data may be representative of one or more graphical user interfaces and/or any other graphical content as may serve a particular implementation. Furthermore, although the controller 210 is described herein as being part of the actuator bank 200 and/or the linear delta system 100 (FIG. 1A), the disclosure is not so limited; rather, as will be understood by one of ordinary skill in the art, the controller 210 may be discrete from the actuator bank 200 and/or the linear delta system 100 and may be remote to the actuator bank 200 and/or the linear delta system 100. The controller 210 is described in greater detail below with reference to FIG. 13.

FIG. 3A shows a perspective view of actuator bank 300 (e.g., an uncommon plane actuator bank) of a linear delta system according to one or more additional embodiments of the present disclosure. FIG. 3B shows a top view of the actuator bank of FIG. 3A. Referring to FIGS. 3A and 3B together, the actuator bank 300 may include a plurality of cross members 307, a plurality of rails 302a, 302b, 302c (referred to generally with the reference numeral 302), a plurality of linear actuators 304a, 304b, 304c (referred to generally with the reference numeral 304), a plurality of drive units 308a, 308b, 308c (referred to generally with the reference numeral 308), and a controller 310.

As shown in FIGS. 3A and 3B, in some embodiments, each of the cross members 307 may include angled portions 309a, 309b formed on longitudinal ends of the cross members 307. Furthermore, the angled portions 309a, 309b may define an angle with a remainder of a respective cross member 307. For instance, the angled portions 309a, 309b may extend in a direction oblique to the direction in which the remainder (e.g., a center portion) of the respective cross member 307 extends. In some embodiments, the angle may be within a range of 10° and about 75°. For instance, the angle may be about 60°. Moreover, outer rails 302 of the plurality of rails 302 may each be mounted to a respective angled portion 309a, 309b of the cross members 307. As a result of the foregoing, the center longitudinal axes of the plurality of rails 302 may be parallel to each other but may not lie within a common plane. For example, the plurality of rails 302 may face a common axis rather than lying within a common plane. Furthermore, the plurality of linear actuators 304, the plurality of drive units 308, and the controller 310 may be operated via any of the manners described above in regard to FIGS. 1A-2.

Figure 4:
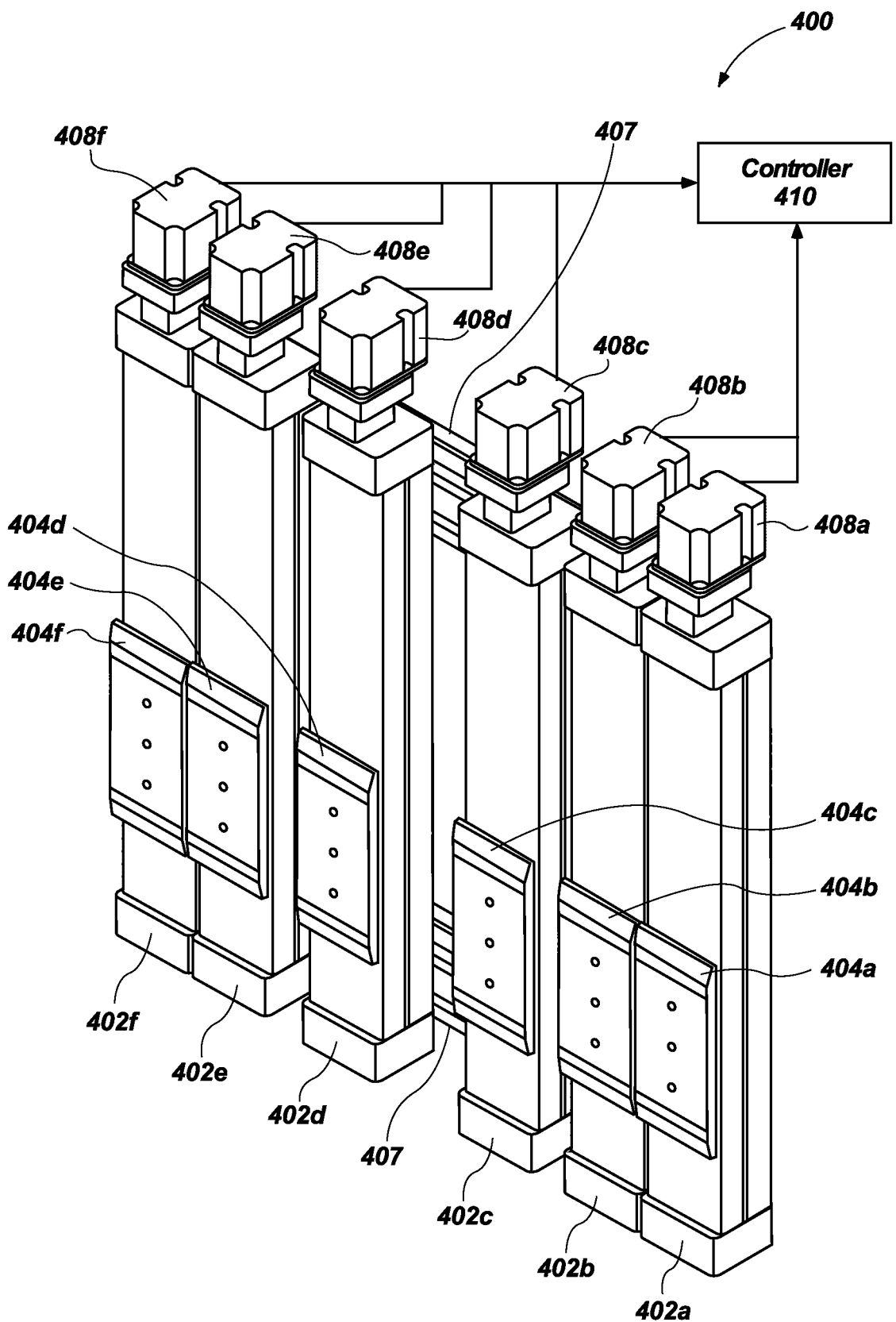
FIG. 4 is a perspective view of the a hexapod actuator bank of a hexapod system according to one or more embodiments of the present disclosure.

FIG. 4 shows a hexapod actuator bank 400 according to one or more embodiments of the present disclosure. The hexapod actuator bank 400 may include a plurality of cross members 407, a plurality of rails (i.e., six rails) 402a, 402b, 402c, 402d, 402e, 402f (referred to generally with the reference numeral 402), a plurality of linear actuators (i.e., six linear actuators) 404a, 404b, 404c, 404d, 404e, 404f (e.g., carriages) (referred to generally with the reference numeral 404), a plurality of drive units 408a, 408b, 408c, 408d, 408e, 408f (referred to generally with the reference numeral 408), and a controller 410. As shown in FIG. 4 the plurality of rails 402 may be mounted to the plurality of cross members 407. The plurality of cross members 407 may be mounted to the support member 105 (FIG. 1A) of the support frame 101 (FIG. 1A) above the first base member 103 (FIG. 1A) via any of the manners described above. Additionally, when the hexapod actuator bank 400 is attached to the support frame 101 (FIG. 1A) in the operating position, the plurality of rails 402 may extend in an at least a substantially vertical direction. Furthermore, center longitudinal axes of the plurality of rails 402 may be parallel to each other and may each lie within a common plane. For example, the center longitudinal axes may extend within a common plane. As another non-limiting example, the plurality of rails 402 may be oriented adjacent to each other in a linear line.

Each linear actuator (e.g., linear actuator 404a) may be movably coupled to a respective rail (e.g., rail 402a) of the plurality of rails 402. Furthermore each linear actuator (e.g., 404a) may be configured to translate along (e.g., back and forth along, up and down along, etc.) a longitudinal length of a respective rail 402. In some embodiments, the movement (e.g., translation) of the linear actuators 404 may be controlled and operated by the plurality of drive units 408 and the controller 410 via conventional manners. The plurality of drive units 408, depicted herein mounted to tops of the plurality of rails 402, may be disposed at any location able to operate the plurality of rails 402. In one or more embodiments, the plurality of drive units 408 (i.e., six drive units) may each include a motor (e.g., electric motor) operably coupled to the controller 410 and a lead screw to which a respective linear actuator is coupled. The motor may rotate the lead screw which, in turn, causes the linear actuator 404 to translate up or down along the lead screw and up or down the respective rail 402. In further embodiments, each drive unit (may include gears and/or pulleys for extending and retracting chains and/or timing belts attached to a respective linear actuator 404).

The controller 410 may be configured to operate the hexapod actuator bank 400 via any of the methods described above. The controller 410 is described in greater detail below with reference to FIG. 13.

Figure 5:
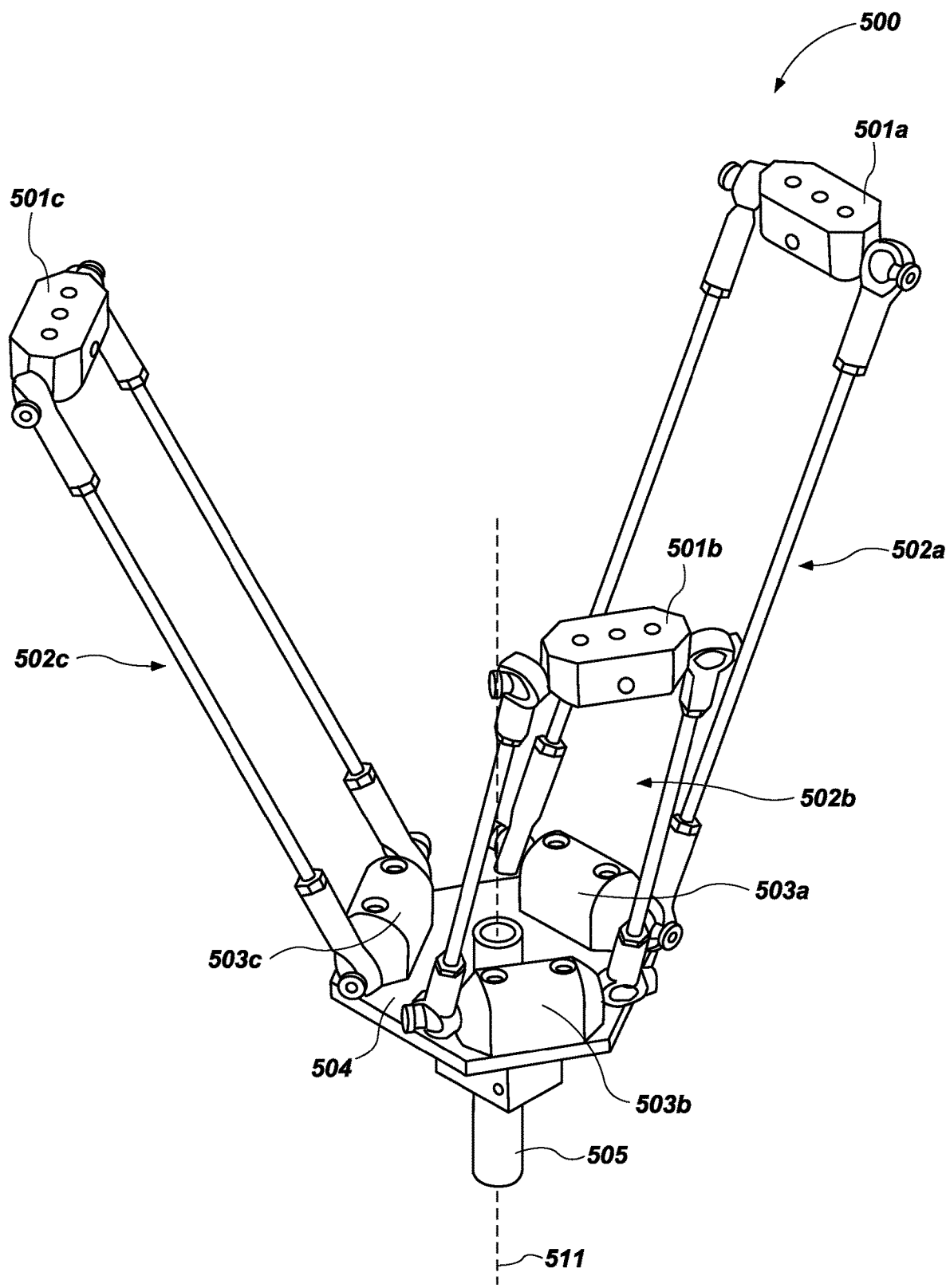
FIG. 5 is a perspective view of a delta platform assembly of a linear delta system according to one or more embodiments of the present disclosure.

FIG. 5 is a perspective view of the delta platform assembly 500 according to one or more embodiments of the present disclosure. Referring to FIGS. 1 and 5 together, the delta platform assembly 500 may include a platform 504, a plurality of pairs of parallel rods 502a, 502b, 502c (referred to generally with the reference numeral 502), a plurality of upper pivot members 501a, 501b, 501c (referred to generally with the reference numeral 501), a plurality of lower pivot members 503a, 503b, 503c (referred to generally with the reference numeral 503).

The delta platform assembly 500 may operate in accordance with conventional linear and rotary delta robot methods. For instance, the plurality of pairs of parallel rods 502 may extend between the plurality of upper pivot members 501 and the plurality of lower pivot member 503. In some embodiments, the lower pivot members 503 may form an integral body with the platform 504. In other embodiments, the lower pivot members 503 may be distinct from the platform 504 but may be attached to the platform 504. As is shown in FIG. 5, a first pair of parallel rods 502a may extend from the upper pivot member 501a to the lower pivot member 503a. Likewise, a second pair and third pair of parallel rods 502b, 502c may extend from the upper pivot members 501b, 501c to the lower pivot members 503b, 503c, respectively.

In some embodiments, the first, second, and third pairs of parallel rods 502a, 502b, 502c may be oriented 120° apart from one another about a center longitudinal axis 511 extending vertically through a center of the platform 504 when the platform 504 is in a typical default orientation. As a result of the foregoing, the delta platform assembly 500 may provide an orientation of the plurality of pairs of parallel rods 502 similar a conventional rotary or linear delta robot. Furthermore, by moving plurality of upper pivot members 501 in conventional rotary arc patterns or linear translational patterns, the platform 504 may be moved within three translational degrees of freedom.

In one or more embodiments, the upper pivot members 501 and the lower pivot members 503 may include spherical and/or universal joints. Moreover, as is known in the art, the rods within the pairs of parallel rods 502 may remain parallel to each other (i.e., always form a parallelogram) during conventional operation of the delta platform assembly 500 and movement of the platform 504.

In one or more embodiments, an object 505 (i.e., an object of interest) may be coupled to the platform 504. In one or more embodiments, the object 505 may include an object to be manipulated (e.g., moved and/or placed) via the delta platform assembly 500. For instance, the object 114 may include a nuclear fuel rod, fiber optic cable, radioactive material, etc. In additional embodiments, the object 505 may include a camera, a probe (e.g., a channel gab probe), a scanner (e.g., a flat plate scanner), a sensor, etc. for imaging and/or testing procedures. In additional embodiments, the object 505 may include mechanisms such as, for example, a gripper, a magnet, a bucket, a shovel, a rake, a gimbal, a quick attach assembly, a force/torque sensor, a handle, material handling device, etc. Linear delta systems utilizing delta platform assemblies such as those described in regard to FIG. 5 are described below in regard to FIGS. 7A, 7B, 8, 10, and 12.

Figure 6:
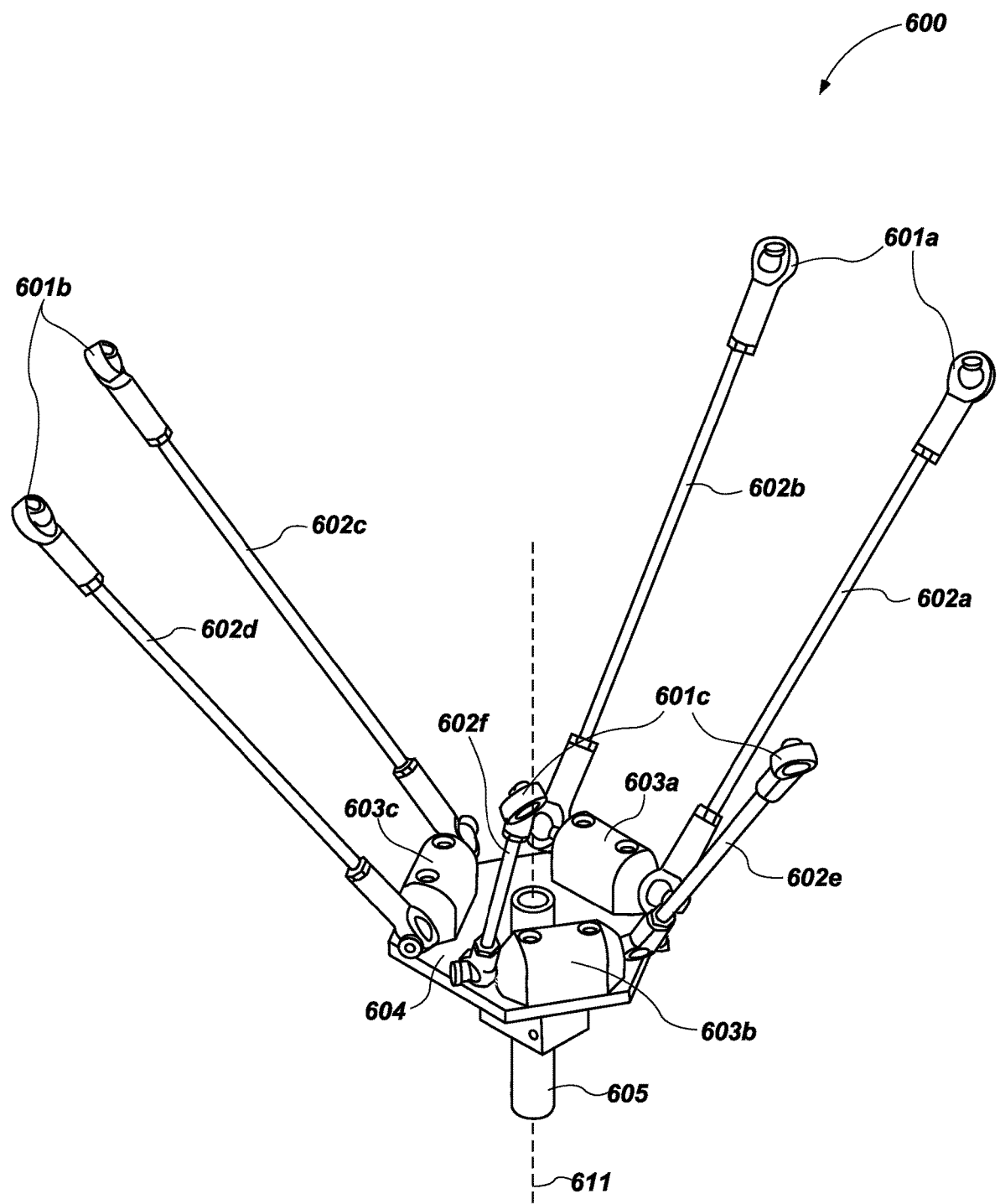
FIG. 6 is a perspective view of the hexapod platform assembly of a hexapod system according to one or more embodiments of the present disclosure.

FIG. 6 is a perspective view of the hexapod platform assembly 600 according to one or more embodiments of the present disclosure. The hexapod platform assembly 600 may include a platform 604, a plurality of rods 602a, 602b, 602c, 602d, 602e, 602f (referred to generally with the reference numeral 602), a plurality of upper pivot members 601a, 601b, 601c, 601d, 601e, 601f (referred to generally with the reference numeral 601), a plurality of lower pivot members 603a, 603b, 603c (referred to generally with the reference numeral 603)

The hexapod platform assembly 600 may operate in accordance with conventional linear and rotary hexapod robot methods. For instance, the plurality of rods 602 may extend between the plurality of upper pivot members 601 and the plurality of lower pivot members 603.

In some embodiments, the plurality of rods 602 may be oriented in pairs (e.g., the pair including rods 602a, 602b, the pair including rods 602c, 602d, and the pair including rods 602e, 602f). Each pair of the plurality of rods 602 may have consistent configurations that are not necessarily parallel. Furthermore, the pairs may be oriented 120° apart from one another about a center longitudinal axis 611 extending vertically through the center of the platform 604 when the platform 604 is in a typical default orientation. As a result of the foregoing, the hexapod platform assembly 600 may provide an orientation of the plurality of rods 602 similar a conventional rotary or linear hexapod robot. Furthermore, by moving plurality of upper pivot members 601 in conventional rotary arc patterns or linear translational patterns, the platform 604 may be moved within six degrees of freedom (three translational and three rotational).

In some embodiments, the upper pivot members 601 and the lower pivot members 603 may include spherical and/or universal joints. Moreover, as is known in the art, the repeated orientation of the rods 602 within the respective pairs simplifies the controlling mathematical models utilized to operate the hexapod platform.

The object 605 may be coupled to the platform 604 via any of the manners described above in regard to FIG. 5. Furthermore, the object 605 may include any of the objects described above in regard to FIG. 5.

Figure 7A:
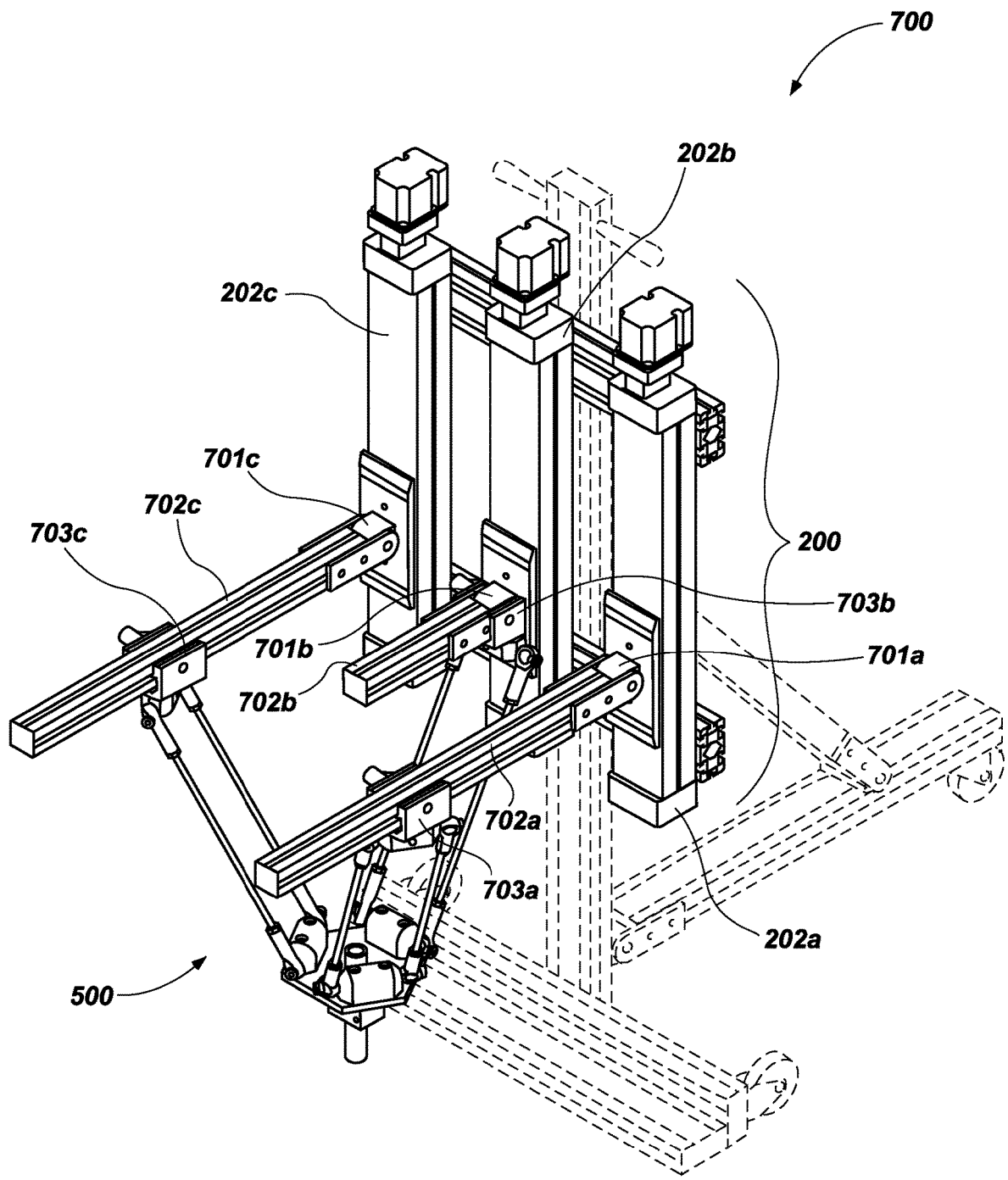
FIG. 7A is a perspective view of a linear delta system in a first operating position according to one or more embodiments of the present disclosure.

FIG. 7A is a perspective view of a linear delta system 700 according to one or more embodiments of the present disclosure. As depicted in FIG. 7A, the linear delta system 700 may include the actuator bank 200 (i.e., the common plane delta actuator bank) of FIG. 2 and the delta platform assembly 500 of FIG. 5. Referring to FIGS. 2, 5, and 7A together, the linear delta system 700 may include a pair of outer cantilever rails 702a, 702c, a center cantilever rail 702b, and a plurality of linear actuator carriages 703a, 703b, 703c. The pair of outer cantilever rails 702a, 702c and the center cantilever rail 702b may be coupled to respective linear actuators of the plurality of linear actuators 204. In some embodiments, the pair of outer cantilever rails 702a, 702c and the center cantilever rail 702b may be coupled to respective linear actuators of the plurality of linear actuators 204 via hinge members 701a, 701b, 701c that enable the pair of outer cantilever rails 702a, 702c and the center cantilever rail 702b to rotate about a horizontal axis relative to the plurality of linear actuators 204.

Figure 7B:
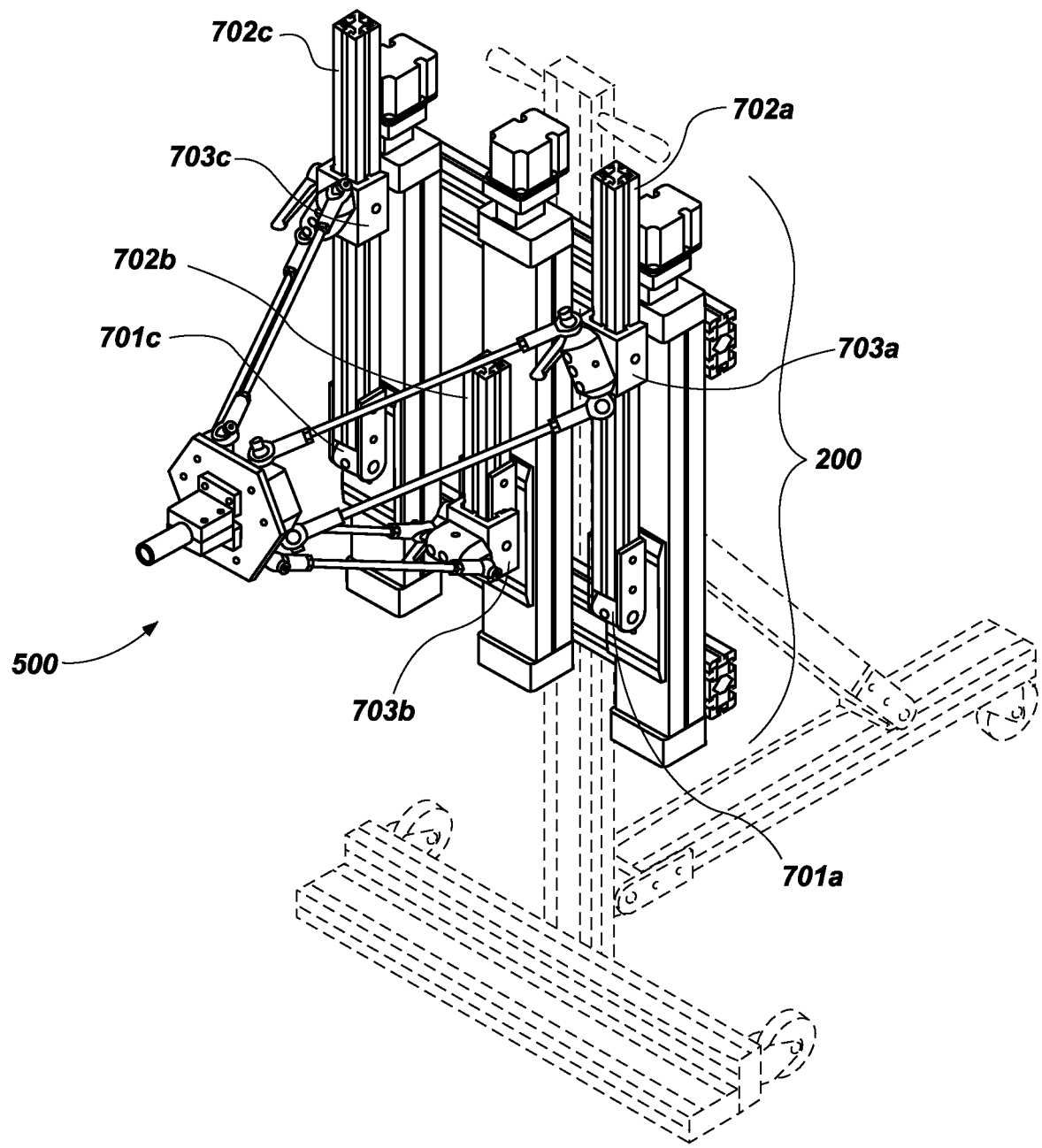
FIG. 7B is a perspective view of the linear delta system of FIG. 7A in a second operating position according to one or more embodiments of the present disclosure.
Figure 7C:
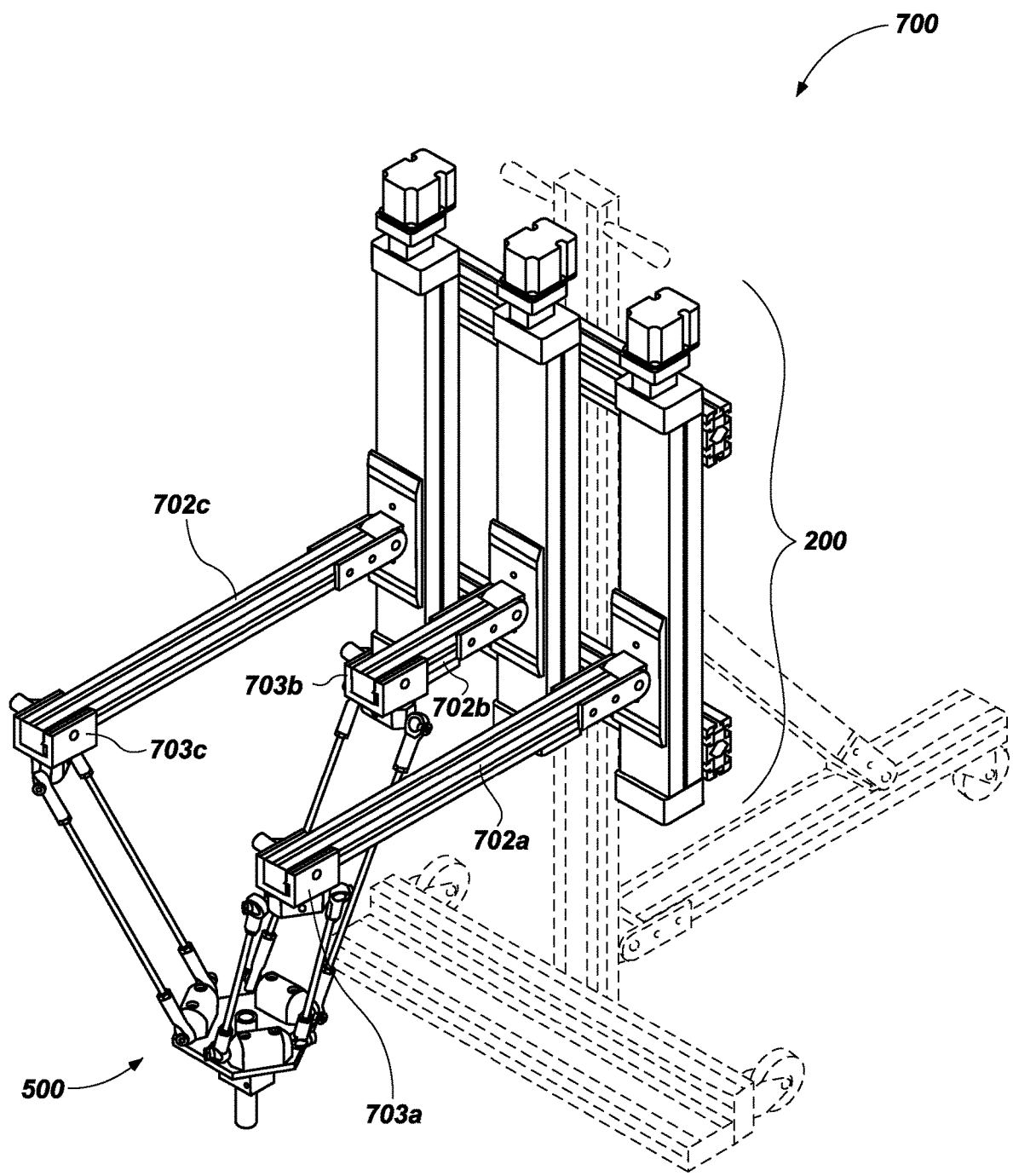
FIG. 7C is another perspective view the linear delta system of FIG. 7A in an extended position according to one or more embodiments of the present disclosure.

FIG. 7B shows a perspective view of the linear delta system 700 with the pair of outer cantilever rails 702a, 702c and the center cantilever rail 702b, and as a result, the delta platform assembly 500 in a rotated position. Referring to FIGS. 7A and 7B together, in some embodiments, the pair of outer cantilever rails 702a, 702c and the center cantilever rail 702b may be manually rotated about the horizontal axis. In other embodiments, the pair of outer cantilever rails 702a, 702c and the center cantilever rail 702b may be automatically rotated about the horizontal axis e.g., via the controller 210 (FIG. 2). Enabling the pair of outer cantilever rails 702a, 702c and the center cantilever rail 702b to rotate about the horizontal axis enables the linear delta system 700 to readily adjust to a workspace, a necessary speed or operation, a necessary accuracy, a level of compactness, etc.

Moreover, the plurality of linear actuator carriages 703a, 703b, 703c may each be coupled to a respective cantilever rail of the pair of outer cantilever rails 702a, 702c and the center cantilever rail 702b and may be configured to translate along a longitudinal length of the respective cantilever rail. For instance, the plurality of linear actuator carriages 703a, 703b, 703c may be configured to translate along the lengths of the pair of outer cantilever rails 702a, 702c and the center cantilever rail 702b at least in the directions depicted in FIG. 7C. Additionally, referring to FIGS. 2, 5, and 7A-7C together, the upper pivot members 501 of the delta platform assembly 500 may be coupled to respective linear actuator carriages of the plurality of linear actuator carriages 703a, 703b, 703c.

In some embodiments, each of the outer cantilever rails of the pair of outer cantilever rails 702a, 702c may have the same length, and the center cantilever rail 702b may be shorter in length than the pair of outer cantilever rails 702a, 702c. Furthermore, each of the outer cantilever rails of the pair of outer cantilever rails 702a, 702c may be spaced from the center cantilever rail by the same distance. Accordingly, the linear delta system 700 may be symmetric about a plane in which center longitudinal axis of the center cantilever rail 702b and a center longitudinal axis of the support member 105 (FIG. 1A) lie.

The pair of outer cantilever rails 702a, 702c and the center cantilever rail 702b may extend longitudinally from their respective linear actuators 204 in a direction at least substantially perpendicular to a longitudinal axis of their respective rails 202 when in a default operating position. In some embodiments, the linear delta system 700 may not include the center cantilever rail 702b, and the upper pivot member 501 correlating to a center rail 202 may be coupled directly to the linear actuator 204.

In some embodiments, lengths of the pair of outer cantilever rails 702a, 702c and the center cantilever rail 702b and/or positions of the linear actuator carriages 703a, 703b, 703c may be selected such that the upper pivot members 501 of the delta platform assembly 500 are oriented and/or operate in a manner similar to conventional methods. For example, translating the plurality of linear actuators 204 along the plurality of rails 202 may correspondingly move the upper pivot members 501 of the delta platform assembly 500 in conventional linear delta translational patterns and enable the platform 504 to be moved within three translational degrees of freedom. As will be appreciated by one of ordinary skill in the art, alternate positioning of the upper pivot members 501, via translation and/or rotation adjustments of the pair of outer cantilever rails 702a, 702c and/or the center cantilever rail 702b may also be utilized to achieve alternate platform 504 movements as determined by application requirements.

Figure 8:
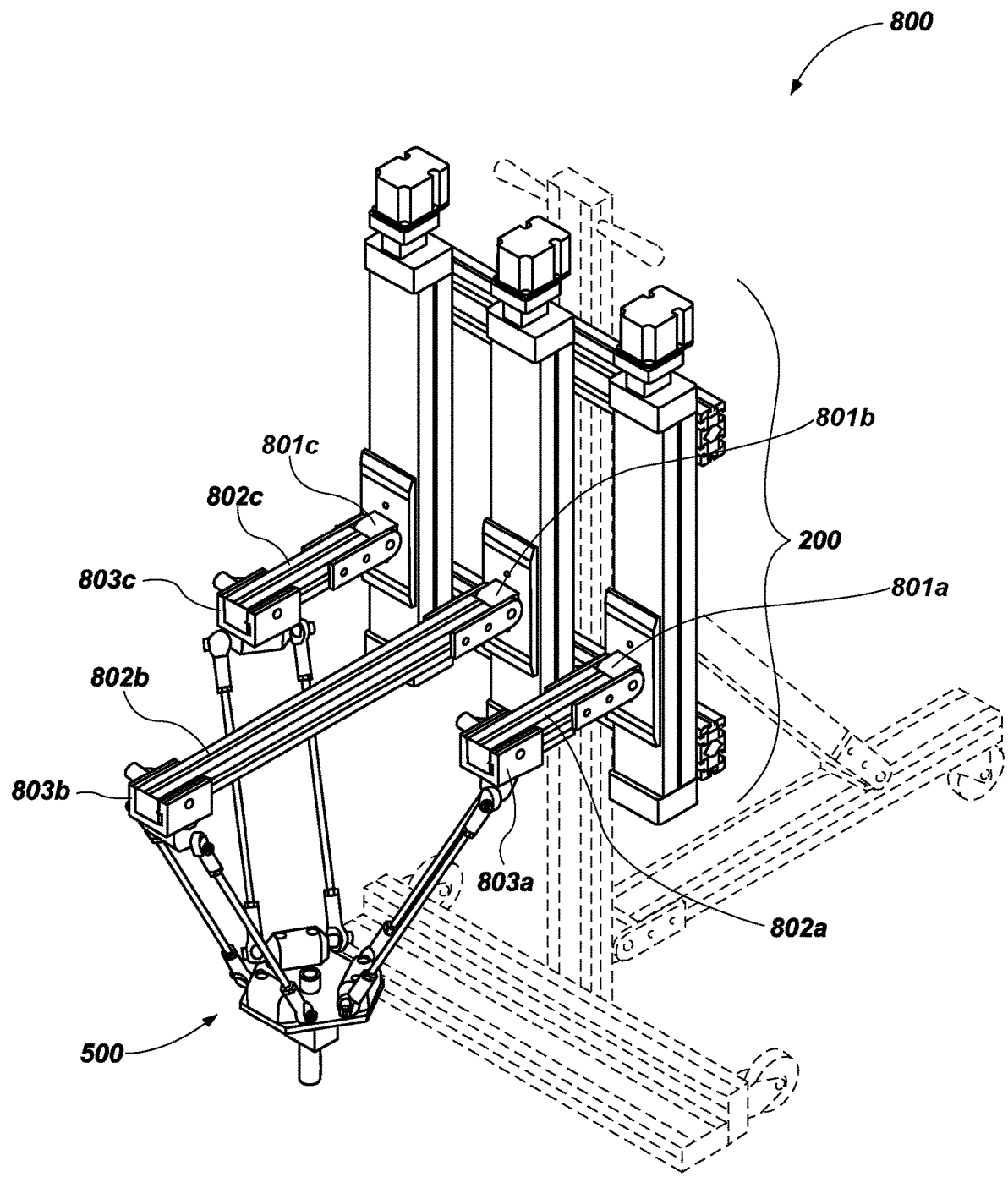
FIG. 8 is a perspective view a linear delta system according to one or more additional embodiments of the present disclosure.

FIG. 8 is a perspective view of a linear delta system 800 according to one or more additional embodiments of the present disclosure. As depicted in FIG. 8, the linear delta system 800 may include the actuator bank 200 (i.e., the common plane delta actuator bank) of FIG. 2 and the delta platform assembly 500 of FIG. 5. Referring to FIGS. 2, 5, and 8 together, the linear delta system 800 may include a pair of outer cantilever rails 802a, 802c, a center cantilever rail 802b, and a plurality of linear actuator carriages 803a, 803b, 803c. Similar to the linear delta system 700 of FIG. 7, the pair of outer cantilever rails 802a, 802c and the center cantilever rail 802b may be coupled to respective linear actuators of the plurality of linear actuators 204. Furthermore, the pair of outer cantilever rails 802a, 802c and the center cantilever rail 802b may be coupled to respective linear actuators of the plurality of linear actuators 204 via hinge members 801a, 801b, 801c that enable the pair of outer cantilever rails 802a, 802c and the center cantilever rail 802b to rotate about a horizontal axis relative to the plurality of linear actuators 204 in a manner similar to the manner described above in regard to FIGS. 7A and 7B.

Moreover, the plurality of linear actuator carriages 803a, 803b, 803c may each be coupled to a respective cantilever rail of the pair of outer cantilever rails 802a, 802c and the center cantilever rail 802b and may be configured to translate along a longitudinal length of the respective cantilever rail. Furthermore, the plurality of linear actuator carriages 803a, 803b, 803c may be configured to translate along the lengths of the pair of outer cantilever rails 802a, 802c and the center cantilever rail 802b in any of the manners described above in regard to FIGS. 7A-7C. Additionally, the upper pivot members 501 of the delta platform assembly 500 may be coupled to respective linear actuator carriages of the plurality of linear actuator carriages 803a, 803b, 803c.

In some embodiments, each of the outer cantilever rails of the pair of outer cantilever rails 802a, 802c may have the same length, and the center cantilever rail 802b may be longer in length than the pair of outer cantilever rails 802a, 802c. Furthermore, each of the outer cantilever rails of the pair of outer cantilever rails 802a, 802c may be spaced from the center cantilever rail by the same distance. Accordingly, the linear delta system 800 may be symmetric about a plane in which center longitudinal axis of the center cantilever rail 802b and a center longitudinal axis of the support member 105 lie.

The pair of outer cantilever rails 802a, 802c and the center cantilever rail 802b may extend longitudinally from their respective linear actuators 204 in a direction at least substantially perpendicular to a longitudinal axis of their respective rails 202 when in a default operating position. In some embodiments, the linear delta system 800 may not include the pair of outer cantilever rails 802a, 802c, and the upper pivot members 501 correlating to the pair of outer cantilever rails 802a, 802c may be coupled directly to their respective linear actuators 204.

Figure 9:
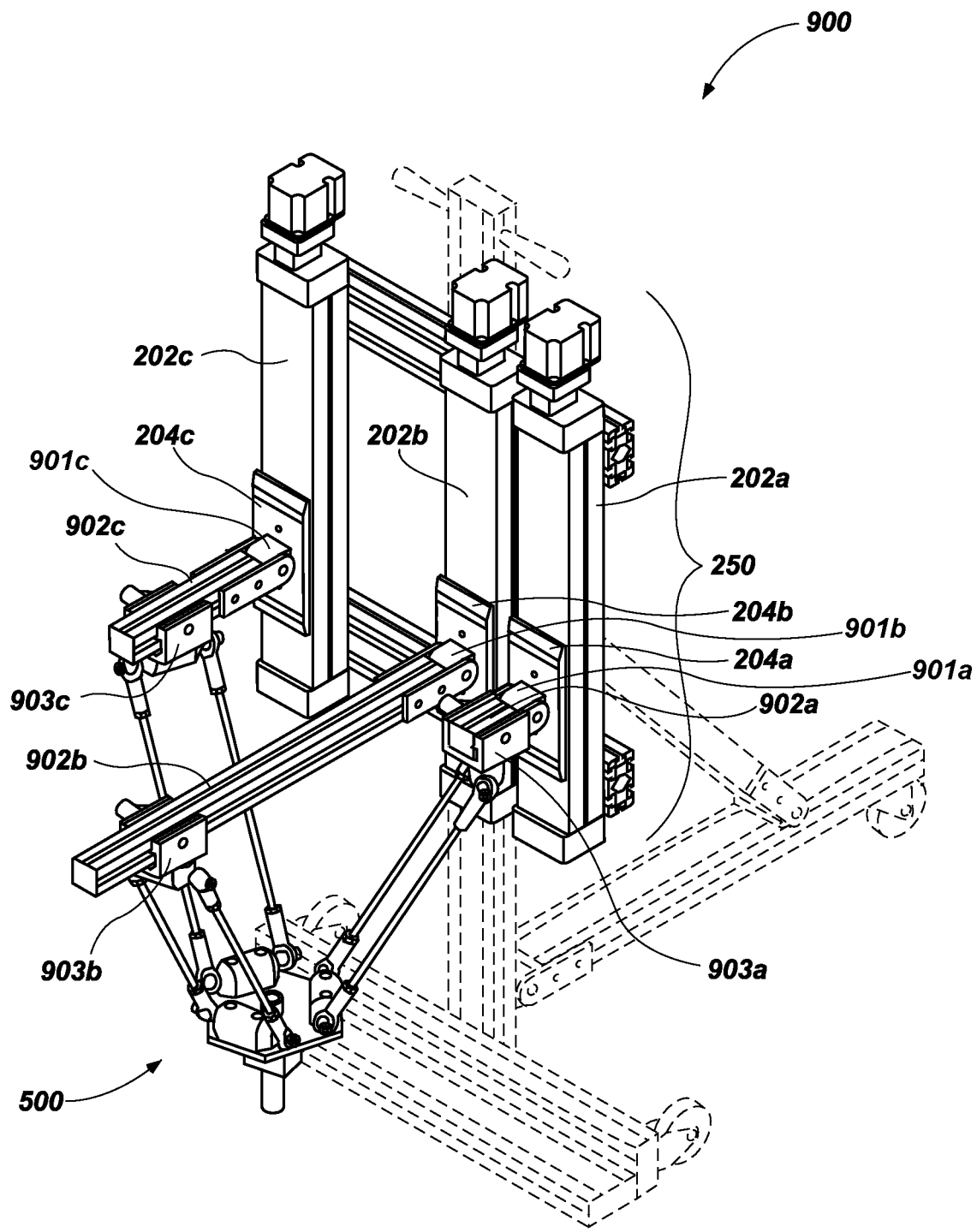
FIG. 9 is a perspective view a linear delta system according to one or more additional embodiments of the present disclosure.

FIG. 9 is a perspective view of a linear delta system 900 according to one or more additional embodiments of the present disclosure. As depicted in FIG. 9, the linear delta system 900 may include an actuator bank 250 (i.e., a common plane delta actuator bank) and the delta platform assembly 500 of FIG. 5. Referring to FIGS. 5 and 9 together, the linear delta system 900 may include a first outer cantilever rail 902a, a second outer cantilever rail 902c, a center cantilever rail 902b, and a plurality of linear actuator carriages 903a, 903b, 903c. The first and second outer cantilever rails 902a, 902c and the center cantilever rail 902b may be coupled to respective linear actuators of the plurality of linear actuators 204 (FIG. 2). Furthermore, the first and second outer cantilever rails 902a, 902c and the center cantilever rail 902b may be coupled to respective linear actuators of the plurality of linear actuators 204 (FIG. 2) via hinge members 901a, 901b, 901c that enable the first and second outer cantilever rails 902a, 902c and the center cantilever rail 902b to rotate about a horizontal axis relative to the plurality of linear actuators 204 in a manner similar to the manner described above in regard to FIGS. 7A and 7B.

Moreover, the plurality of linear actuator carriages 903a, 903b, 903c may each be coupled to a respective cantilever rail of the first and second outer cantilever rails 902a, 902c and the center cantilever rail 902b and may be configured to translate along a longitudinal length of the respective cantilever rail. Furthermore, the plurality of linear actuator carriages 903a, 903b, 903c may be configured to translate along the lengths of the first and second outer cantilever rails 902a, 902c and the center cantilever rail 902b in any of the manners described above in regard to FIGS. 7A-7C. Additionally, the upper pivot members 501 of the delta platform assembly 500 may be coupled to respective linear actuator carriages of the plurality of linear actuator carriages 903a, 903b, 903c.

In some embodiments, each of the cantilever rails of the first and second outer cantilever rails 902a, 902c and the center cantilever rail 902b may have differing lengths. For example, in the embodiments depicted in FIG. 9, the center cantilever rail 902b may have a longest length, the second outer cantilever rail 902c may a second longest length, and the first outer cantilever rail 902a may have a shortest length. Furthermore, each of the outer cantilever rails of the first and second outer cantilever rails 902a, 902c may be spaced from the center cantilever rail 902b by a different distance. Accordingly, the linear delta system 900 may be asymmetric about a plane in which center longitudinal axis of the center cantilever rail 902b and a center longitudinal axis of the support member 105 lie. For instance, as shown in FIG. 9, rail 202b may laterally shifted toward rail 202a to create a configuration where the upper pivot members 501 of the delta platform assembly 500 are attachable to the cantilever rails 902 in an orientation that allows conventional operation. In some embodiments, relative to the upper pivot members of FIG. 8, the upper pivot members 501 and pairs of parallel rods of FIG. 9 may be rotated about vertical axes.

The first and second outer cantilever rails 902a, 902c and the center cantilever rail 902b may extend longitudinally from their respective linear actuators 204 in a direction at least substantially perpendicular to a longitudinal axis of their respective rails 202 (FIG. 2) when in a default operating position. In some embodiments, the linear delta system 900 may not include one or more of the first and second outer cantilever rails 902a, 902c or the center cantilever rail 902b and the upper pivot member 501 correlating to the missing cantilever rail may be coupled directly to its respective linear actuators 204 (FIG. 2).

In some embodiments, lengths of the first outer cantilever rail 902a, the second outer cantilever rail 902c, and the center cantilever rail 902b and/or the positions of the linear actuator carriages 903a, 903b, 903c may be selected such that the upper pivot members 501 of the delta platform assembly 500 are oriented and/or operate in a manner similar to conventional methods. For example, translating the plurality of linear actuators 204 (FIG. 2) along the plurality of rails 202 (FIG. 2) may correspondingly move the upper pivot members 501 of the delta platform assembly 500 in conventional linear delta translational patterns and enable the platform 504 to be moved within three translational degrees of freedom. As will be appreciated by one of ordinary skill in the art, alternate positioning of the upper pivot members 501, via translation and/or rotation adjustments of the first outer cantilever rail 902a, the second outer cantilever rail 902c, and/or the center cantilever rail 902b may also be utilized to achieve alternate platform 504 movements as determined by application requirements.

Figure 10A:
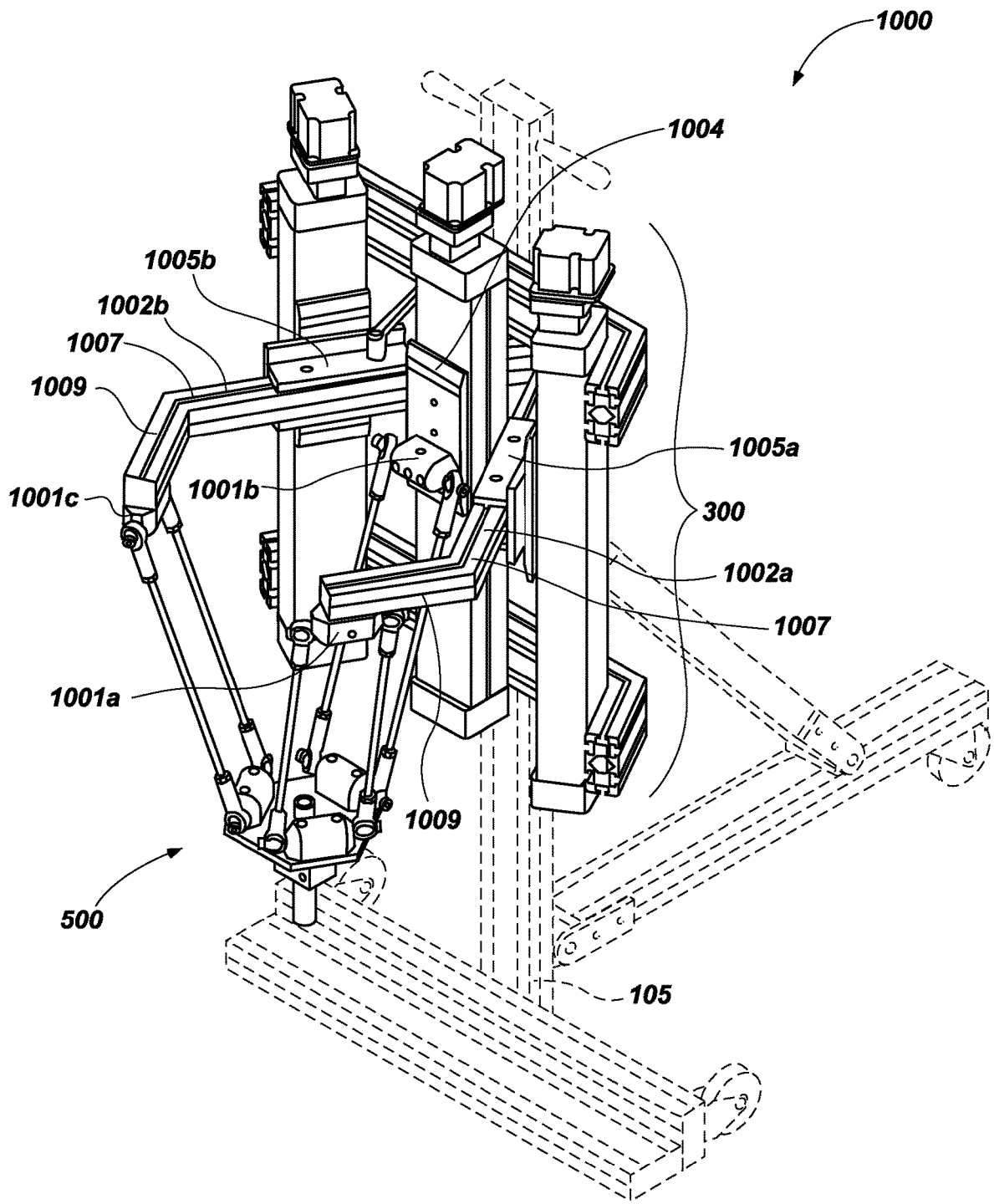
FIG. 10A is a perspective view a linear delta system in a first operating position according to one or more embodiments of the present disclosure.

FIG. 10A is a perspective view of a linear delta system 1000 according to one or more additional embodiments of the present disclosure. As depicted in FIG. 10A, the linear delta system 1000 may include the actuator bank 300 (i.e., the uncommon plane delta actuator bank) of FIG. 3 and the delta platform assembly 500 of FIG. 5. Referring to FIGS. 3, 5, and 10A together, the linear delta system 1000 may include a pair of outer cantilever rails 1002a, 1002b (referred to herein generally with reference numeral 1002) and a pair of rotatable linear actuators 1005a, 1005b (referred to herein generally with the reference numeral 1005). Each outer cantilever rail 1002 may have a first portion 1007 and a second portion 1009 connected to the first portion 1007. Furthermore, a longitudinal axis of the first portion 1007 may define an acute angle with a longitudinal axis of the second portion 1009. In other words, the second portion 1009 may extend in a direction oblique to the direction in which the first portion extends. In some embodiments, the second portions 1009 of the pair of rotatable linear actuators 1005a, 1005b may extend inward toward one another and toward a common point when extended a same distance from the actuator bank 300 (described below).

Figure 10B:
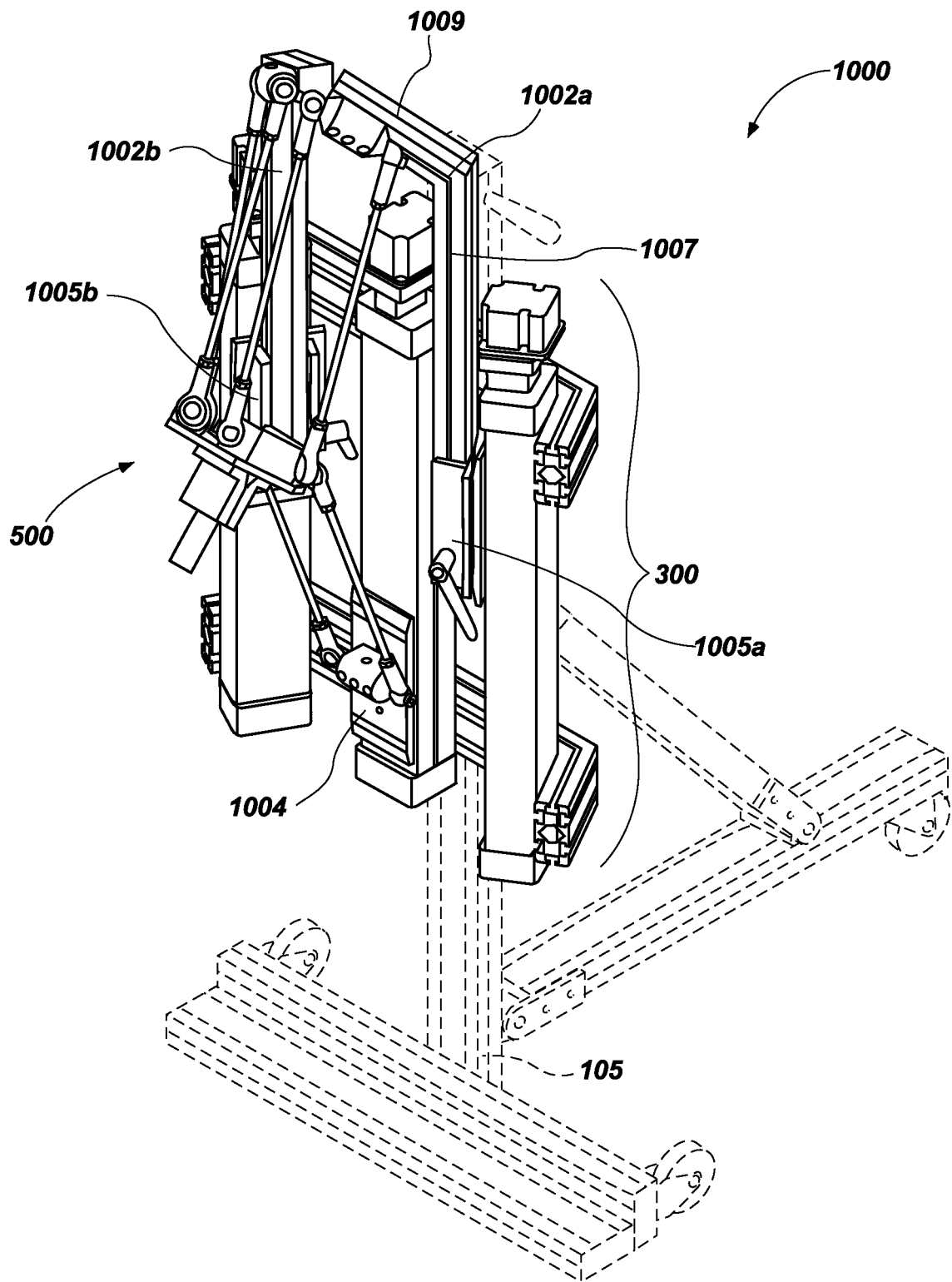
FIG. 10B is a perspective view the linear delta system of FIG. 10A in a second operating position according to one or more embodiments of the present disclosure.
Figure 10C:
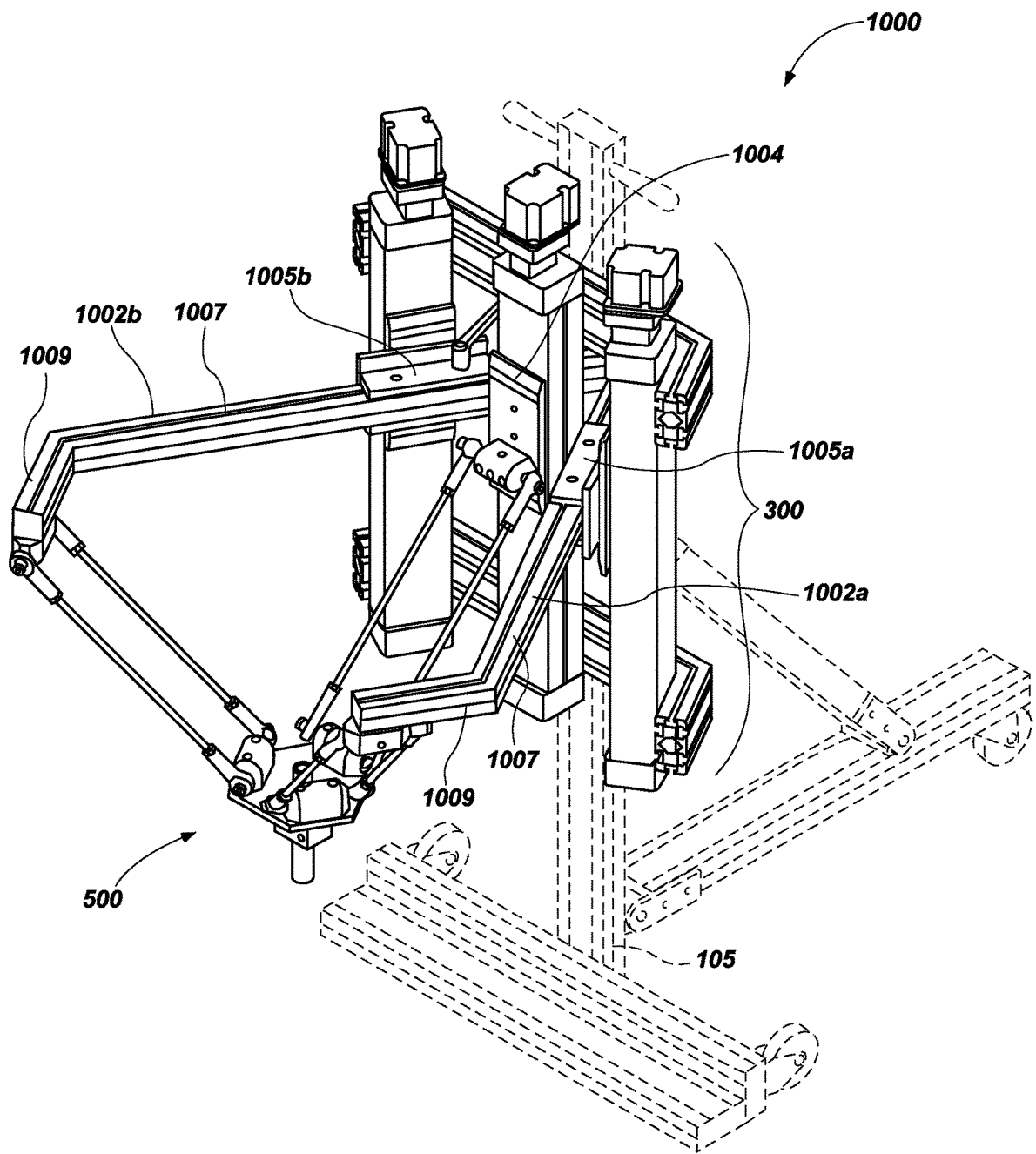
FIG. 10C is a perspective view the linear delta system of FIG. 10A in an extended position according to one or more embodiments of the present disclosure.

In some embodiments, each rotatable linear actuator 1005 may define a channel through which a first portion 1007 of a respective outer cantilever rail 1002 extends. For instance, a first portion 1007 of an outer cantilever rail 1002 may be slidably coupled to a respective rotatable linear actuator 1005. Furthermore, each rotatable linear actuator 1005 may be rotatable about a horizontal axis extending through a center of the rotatable linear actuator 1005 and intersecting a longitudinal axis of a respective rail 302. Accordingly, the pair of outer cantilever rails 1002a, 1002b may be rotatable about a horizontal axis relative to the plurality of rails 302. FIG. 10B shows a perspective view of the linear delta system 1000 with the pair of outer cantilever rails 1002a, 1002b, and as a result, the delta platform assembly 500 in a rotated position. Referring to FIGS. 10A and 10B together, in some embodiments, the pair of outer cantilever rails 1002a, 1002b may be manually rotated about the horizontal axis. In other embodiments, the pair of outer cantilever rails 1002a, 1002b may be automatically rotated about the horizontal axis e.g., via the controller 310 (FIG. 3). Enabling the pair of outer cantilever rails 1002a, 1002b to rotate about the horizontal axis enables the linear delta system 1000 to readily adjust to a workspace, a necessary speed or operation, a necessary accuracy, a level of compactness, etc.

In one or more embodiments, an upper pivot member 1001 of the delta platform assembly 500 may be coupled to each of the second portions 1009 of the pair of outer cantilever rails 1002a, 1002b. Furthermore, another upper pivot member may be coupled directly to a linear actuator 1004. In other embodiments, the linear delta system 1000 may include an additional cantilever rail and linear carriage assembly such as any of the cantilever rails and linear carriages described above in regard to FIGS. 7-9 and the another upper pivot member may be coupled to the cantilever rail via the linear carriage. The pair of outer cantilever rails 1002a, 1002b may extend longitudinally from their respective rotatable linear actuators 1005 in directions at least substantially perpendicular to a longitudinal axis of their respective rails 302 when in a default operating position.

In some embodiments, each of the outer cantilever rails of the pair of outer cantilever rails 1002a, 1002b may have the same length. Furthermore, each of the outer cantilever rails of the pair of outer cantilever rails 702a, 702c may be spaced from a rail 302 by the same distance. Accordingly, the linear delta system 1000 may be symmetric about a plane in which a center longitudinal axis of the support member 105 lies.

In some embodiments, lengths and/or positions of the pair of outer cantilever rails 1002a, 1002b may be selected such that the upper pivot members 1001a, 1001b, 1001c of the delta platform assembly 500 are oriented and/or operate in a manner similar to conventional methods. For example, sliding pair of outer cantilever rails 1002a, 1002b outward and inward relative to the actuator bank 300 (FIG. 10C) and/or translating the rotatable linear actuators 1005 and linear actuator 1004 along longitudinal lengths of the plurality of rails 302 may correspondingly move the upper pivot members 501 of the delta platform assembly 500 in conventional linear delta translational patterns and enable the platform 504 to be moved within three translational degrees of freedom. As will be appreciated by one of ordinary skill in the art, alternate positioning of the upper pivot members 501, via translation and/or rotation adjustments of the pair of outer cantilever rails 1002a, 1002b and/or the center cantilever rail 702b may also be utilized to achieve alternate platform 504 movements as determined by application requirements.

Figure 11:
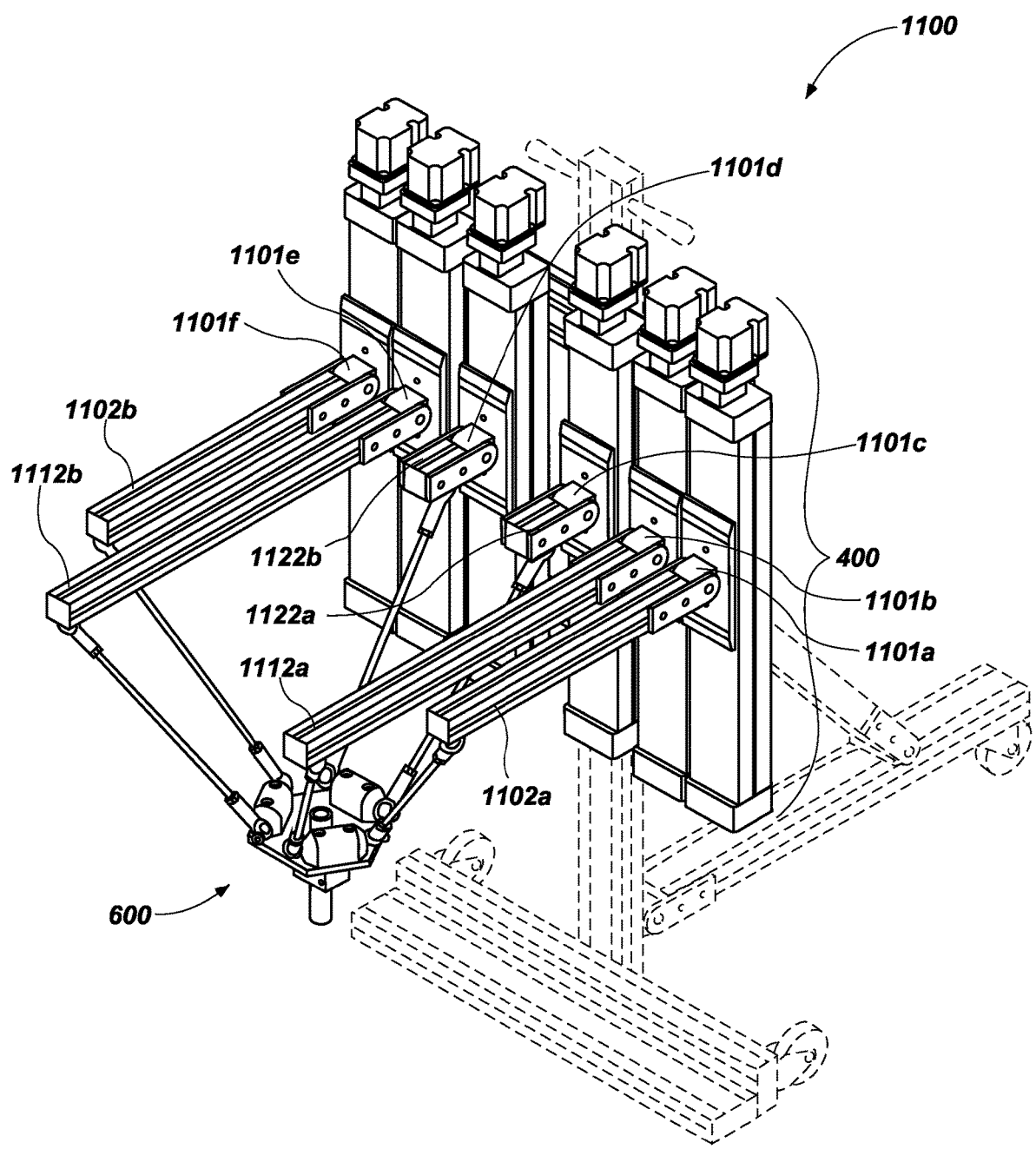
FIG. 11 is a perspective view of the hexapod system according to one or more embodiments of the present disclosure.
Figure 12:
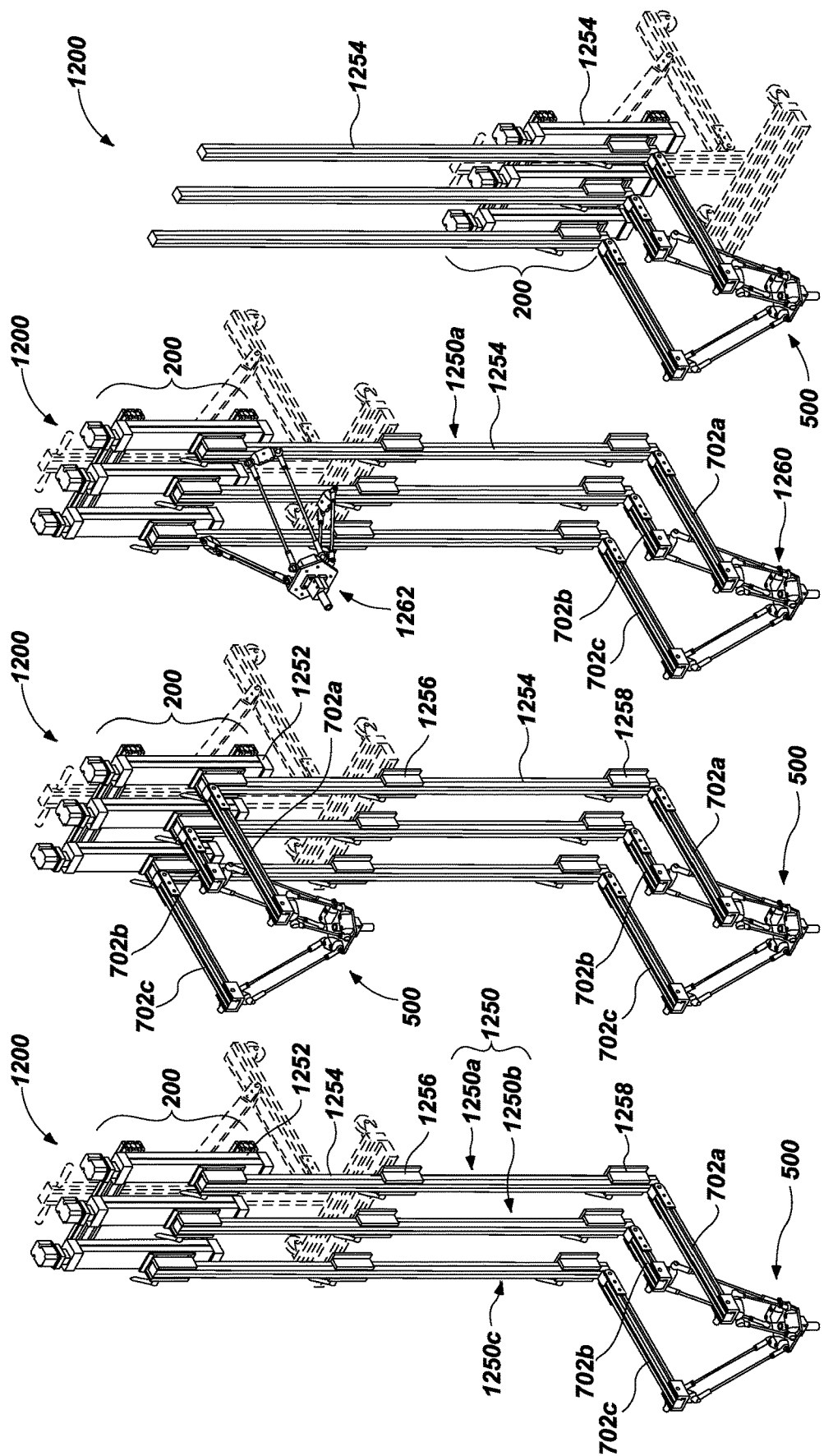
FIG. 12A is a perspective view of an extension linear delta system according to one or more embodiments of the present disclosure.
FIG. 12B is a perspective view of an extension linear delta system according to one or more additional embodiments of the present disclosure.
FIG. 12C is a perspective view of an extension linear delta system according to one or more additional embodiments of the present disclosure.
FIG. 12D is another perspective view of the extension linear delta system of FIG. 12A according to one or more additional embodiments of the present disclosure.

FIG. 11 is a perspective view of a linear delta system 1100 according to one or more embodiments of the present disclosure. As depicted in FIG. 11, the linear delta system 1100 may include the hexapod actuator bank 400 (i.e., the common plane hexapod actuator bank) of FIG. 4 and the hexapod platform assembly 600 of FIG. 6. Furthermore, the linear delta system 1100 may include a pair of outer cantilever rails 1102a, 1102b, a pair of middle cantilever rails 1112a, 1112b, and a pair of center cantilever rails 1122a, 1122b. The pair of outer cantilever rails 1102a, 1102b, a pair of middle cantilever rails 1112a, 1112b, and a pair of center cantilever rails 1122a, 1122b may be coupled to respective linear actuators of the plurality of linear actuators 204. In some embodiments, the pair of outer cantilever rails 1102a, 1102b, a pair of middle cantilever rails 1112a, 1112b, and a pair of center cantilever rails 1122a, 1122b may be coupled to respective linear actuators of the plurality of linear actuators 404 via hinge members 1101a, 1101b, 1101c, 1101d, 1101e, 1101f that enable the pair of outer cantilever rails 1102a, 1102b, the pair of middle cantilever rails 1112a, 1112b, and the pair of center cantilever rails 1122a, 1122b to rotate about a horizontal axis relative to the plurality of linear actuators 404. In some embodiments, the pair of outer cantilever rails 1102a, 1102b, the pair of middle cantilever rails 1112a, 1112b, and the pair of center cantilever rails 1122a, 1122b may be manually rotated about the horizontal axis. In other embodiments, the pair of outer cantilever rails 1102a, 1102b, the pair of middle cantilever rails 1112a, 1112b, and the pair of center cantilever rails 1122a, 1122b may be automatically rotated about the horizontal axis e.g., via the controller 410 (FIG. 4). Enabling the pair of outer cantilever rails 1102a, 1102b, the pair of middle cantilever rails 1112a, 1112b, and the pair of center cantilever rails 1122a, 1122b to rotate about the horizontal axis enables the linear delta system 1100 to readily adjust to a workspace, a necessary speed or operation, a necessary accuracy, a level of compactness, etc.

Moreover, each rod of the plurality of rods 602 may be coupled to a respective cantilever rail. In some embodiments, each of the outer cantilever rails of the pair of outer cantilever rails 1102a, 1102b may have the same length, each of the middle cantilever rails of the pair of middle cantilever rails 1112a, 1112b may have the same length, and each of the center cantilever rails of the pair of center cantilever rails 1122a, 1122b may have the same length. In some embodiments, the pair of middle cantilever rails 1112a, 1112b may have the longest length, with the pair of outer cantilever rails 1102a, 1102b having the second longest length and the pair of center cantilever rails 1122a, 1122b having the shortest length. Furthermore, the linear delta system 1100 may be symmetric about a plane in which the center longitudinal axis of the support member 105 and the center longitudinal axis of the second base member 109 lies.

The pair of outer cantilever rails 1102a, 1102b, the pair of middle cantilever rails 1112a, 1112b, and the pair of center cantilever rails 1122a, 1122b may extend longitudinally from their respective linear actuators 404 in a direction at least substantially perpendicular to a longitudinal axis of their respective rails 402 when in a default operating position. In some embodiments, the linear delta system 700 may not include one or more of the pair of outer cantilever rails 1102a, 1102b, the pair of middle cantilever rails 1112a, 1112b, and the pair of center cantilever rails 1122a, 1122b the center cantilever rail 702b, and the rods 602 correlating to missing cantilever rails may be coupled directly to the linear actuators 404.

Furthermore, the lengths of the pair of outer cantilever rails 1102a, 1102b, the pair of middle cantilever rails 1112a, 1112b, and the pair of center cantilever rails 1122a, 1122b be selected and/or adjusted to rotate the orientation of the platform 604 of the hexapod platform assembly 600 to correspond to the linear delta orientations depicted in FIGS. 7 and 9.

The linear delta systems and hexapod systems described in present disclosure may be advantageous over conventional serial style scanning systems (e.g., non-destructive examination scanning platforms) by providing a more compact geometry that improves mobility and increases available workspace. For example, traditional scanning systems are conventionally relatively large, bulky, and immobile. On the other hand, due to the linear delta systems' and hexapod systems' compact geometry and being mount on wheels, the linear delta systems and hexapod systems are mobile. Furthermore, because the plurality of rails are parallel to each other and are orientated on one side of a workspace, the platform assemblies are not limited in working space by rails surrounding the platforms as is typical with conventional linear delta systems. As result, the linear delta systems and hexapod systems have an increased working space in comparison to a conventional linear delta systems and hexapod systems. Moreover, because the linear delta systems and hexapod systems have a relatively compact geometry, the linear delta systems and hexapod systems reduce a likelihood of tipping and rocking during operation at high speeds in comparison to conventional parallel and serial robot systems. In view of the foregoing, the linear delta systems and hexapod systems provide a more mobile system that is more accommodating to an object's size, orientation, and location and a system that maintains the structural integrity (e.g., stiffness), the precision, and the speed of a conventional serial style scanning system.

FIG. 12A is a perspective view of an extension linear delta system 1200 having a plurality of extension assemblies 1250a, 1250b, 1250c (referred to herein generally with reference numeral 1250) according to one or more embodiments of the present disclosure. The extension linear delta system 1200 may include the actuator bank 200 of FIG. 2, the pair of outer cantilever rails 702a, 702c and the center cantilever rail 702b of FIGS. 7A and 7B, and the delta platform assembly 500 of FIG. 5. However, the extension linear delta system 1200 may include any of the actuator banks and linear delta systems described above in regard to FIGS. 2-11.

Referring to FIGS. 2, 5, 7A-7C, and 12A together, each of the extension assemblies 1250 includes an upper linear bearing 1252 and an extension rails 1254. The upper linear bearings 1252 may each be mounted to a respective linear actuator 204 of the actuator bank 200. Furthermore, the extension rails 1254 may be coupled to the upper linear bearings 1252. In some embodiments, the extension rails 1254 may be movably coupled to the upper linear bearings 1252 such that the extension rails 1254 can translate relative to the upper linear bearings 1252 as depicted in FIG. 12D. In one or more embodiments, the upper linear bearings 1252 may be lockable such that the extension rails 1254 can be selectively fixed relative to upper linear bearings 1252.

In one or more embodiments, the pair of outer cantilever rails 702a, 702c and the center cantilever rail 702b may be mounted to longitudinal ends of the extension rails 1254, and the delta platform assembly 500 may be coupled to the pair of outer cantilever rails 702a, 702c and the center cantilever rail 702b via any of the manners described above in regard to FIGS. 7A and 7B. Furthermore, the delta platform assembly 500 may be operated via any of the manners described above in regard to FIGS. 7A and 7B.

In some embodiments, each of the extension assemblies 1250 further includes a middle linear bearing 1256 and a lower linear bearing 1258. The middle linear bearings 1256 and the lower linear bearings 1258 may provide additional support the extension rails 1254 during operation. In one or more embodiments, the middle linear bearings 1256 and the lower linear bearings 1258 may also be lockable such that the extension rails 1254 can be selectively fixed relative to middle linear bearings 1256 and/or the lower linear bearings 1258. Furthermore, although only three linear bearings are described per extension rail 1254, the disclosure is not so limited, and the extension assemblies 1250 may include any number of linear bearings for supporting movement of the extension rails 1254. Furthermore, in some embodiments, each extension rail 1254 may include a same number of linear bearings. In other embodiments, a number of linear bearings associated within the extension rails 1254 of the extension assemblies 1250 may vary extension rail 1254 to extension rail 1254.

Referring to FIG. 12B, in some embodiments, the extension linear delta system 1200 may include multiple sets of the same cantilever rails and platform assemblies mounted to the extension assemblies 1250. For instance, as shown in FIG. 12B, the extension linear delta system 1200 may include two pairs of outer cantilever rails 702a, 702c and two center cantilever rails 702b of FIGS. 7A and 7B. Furthermore, the extension linear delta system 1200 may include two delta platform assemblies 500 of FIG. 5. In some embodiments, the delta platform assemblies 500 may be operated (via any of the manners described above in regard to FIGS. 7A and 7B) to mimic each other. Accordingly, in such embodiments, the delta platform assemblies 500 may remain a fixed distance from each other. Having two delta platform assemblies 500 mimic each other's movements may provide advantages in manipulating cabling, piping, rods, etc.

Referring to FIG. 12C, in some embodiments, the extension linear delta system 1200 may include a set of the cantilever rails and a first platform assembly 1260 mounted at a first linear location of the extension assemblies 1250 as described above in regard to FIG. 12A and a second platform assembly 1262 mounted at a different linear location of the extension assemblies 1250 directly to the extension rails 1254 of the extension assemblies 1250. As will be understood by one of ordinary skill in the art, operating the extension linear delta system 1200 as depicted in FIG. 12C will result in different movements for the first platform assembly 1260 and the second platform assembly 1262. The movements can either be cooperated to generate particular manipulations based on relative movements and/or may be assigned independent operations given a common actuator bank and inputs.

Referring to FIGS. 12A-12D together, in some embodiments, the linear bearings may be lockable via one or more release and/or fastening mechanisms. The release and/or fastening mechanisms may enable the extension rails 1254 to translate relative to the actuator bank 200. In view of the foregoing, a location of a workspace may be adjusted relative to the actuator bank 200.

Referring still to FIGS. 2 and 12A-12D together, the extension assemblies 1250 of the present disclosure may provide advantages over conventional linear delta systems. For instance, because the delta platform assembly 500 may be lowered via the extension rails 1254 and may be usable in relatively deep (e.g., greater than ten, twenty, or thirty feet deep) underwater applications without requiring the permanent framing typically necessary for use of conventional linear delta systems in relatively deep underwater applications. For example, extension assemblies 1250 may be usable in canals for storing nuclear fuel assemblies. Furthermore, the drive units 208a, 208b, 208c may be disposed above the water in such applications such that the drive units 208a, 208b, 208c are separated from any harsh environments experienced by the platform 504 and object 505.

Figure 13:
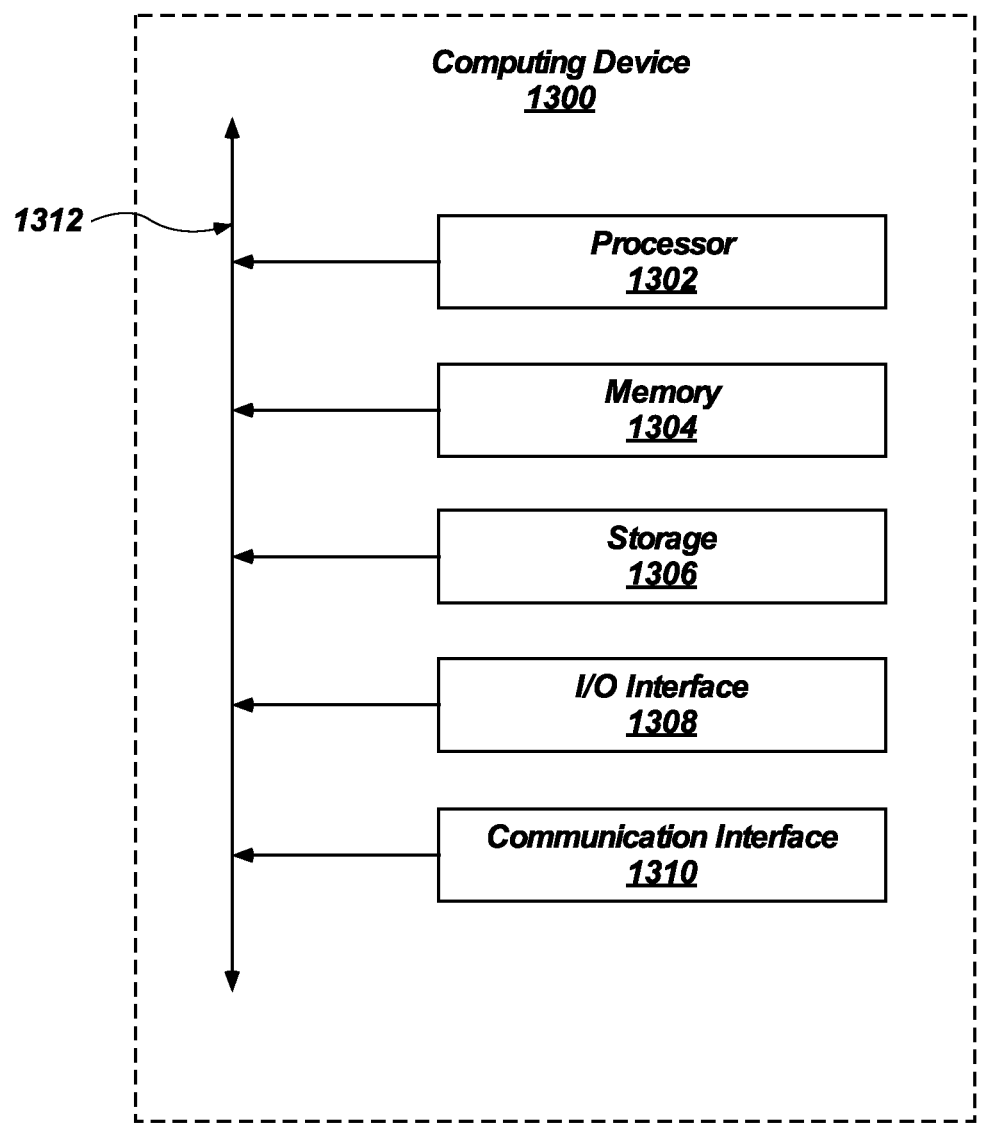
FIG. 13 is schematic diagram of a controller of a linear delta system according to one or more embodiments of the present disclosure.

FIG. 13 is a block diagram of a controller 110 according to one or more embodiments of the present disclosure. As shown in FIG. 13, in some embodiments, the controller 110 may include the linear delta operating system 1300. One will appreciate that one or more computing devices may implement the linear delta operating system 1300. The linear delta operating system 1300 can comprise a processor 1302, a memory 1304, a storage device 1306, an I/O interface 1308, and a communication interface 1310, which may be communicatively coupled by way of a communication infrastructure. While an exemplary computing device is shown in FIG. 13, the components illustrated in FIG. 13 are not intended to be limiting. Additional or alternative components may be used in other embodiments. Furthermore, in certain embodiments, the linear delta operating system 1300 can include fewer components than those shown in FIG. 13. Components of the linear delta operating system 1300 shown in FIG. 13 will now be described in additional detail.

In one or more embodiments, the processor 1302 includes hardware for executing instructions, such as those making up a computer program. As an example and not by way of limitation, to execute instructions, the processor 1302 may retrieve (or fetch) the instructions from an internal register, an internal cache, the memory 1304, or the storage device 1306 and decode and execute them. In one or more embodiments, the processor 1302 may include one or more internal caches for data, instructions, or addresses. As an example and not by way of limitation, the processor 1302 may include one or more instruction caches, one or more data caches, and one or more translation lookaside buffers ("TLBs"). Instructions in the instruction caches may be copies of instructions in the memory 1304 or the storage device 1306.

The memory 1304 may be used for storing data, metadata, and programs for execution by the processor(s). The memory 1304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1304 may be internal or distributed memory.

The storage device 1306 includes storage for storing data or instructions. As an example and not by way of limitation, storage device 1306 can comprise a non-transitory storage medium described above. The storage device 1306 may include a hard disk drive ("HDD"), a floppy disk drive, flash memory, an optical disc, a magneto-optical disc, magnetic tape, or a Universal Serial Bus ("USB") drive or a combination of two or more of these. The storage device 1306 may include removable or non-removable (or fixed) media, where appropriate. The storage device 1306 may be internal or external to the linear delta operating system 1300. In one or more embodiments, the storage device 1306 is non-volatile, solid-state memory. In other embodiments, the storage device 1306 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1308 allows a user to provide input to, receive output from, and otherwise transfer data to and receive data from linear delta operating system 1300. The I/O interface 1308 may include a mouse, a keypad or a keyboard, a touch screen, a camera, an optical scanner, network interface, modem, other known I/O devices or a combination of such I/O interfaces. The I/O interface 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1308 is configured to provide graphical data to a display for presentation to a user. The graphical data may be representative of one or more graphical user interfaces and/or any other graphical content as may serve a particular implementation.

The communication interface 1310 can include hardware, software, or both. In any event, the communication interface 1310 can provide one or more interfaces for communication (such as, for example, packet-based communication) between the linear delta operating system 1300 and one or more other computing devices or networks. As an example and not by way of limitation, the communication interface 1310 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 1310 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1310 may facilitate communications with a wireless PAN ("WPAN") (such as, for example, a BLUETOOTH WPAN"), a WI-FI network, a WI-MAX network, a cellular telephone network (such as, for example, a Global System for Mobile Communications ("GSM") network), or other suitable wireless network or a combination thereof.

Additionally, the communication interface 1310 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1312 may include hardware, software, or both that couples components of the linear delta operating system 1300 to each other. As an example and not by way of limitation, the communication infrastructure 1312 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINI-BAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

One or more embodiments of the present disclosure may include a system, including: a support frame. The system may also include rails mounted to the support frame, where longitudinal axes of the rails are oriented parallel to each other and lie within a common plane. The system may also include linear actuators, each linear actuator coupled to a respective rail of the rails and configured to translate along a longitudinal length of the respective rail. The system may also include pairs of parallel rods each operably coupled to a respective linear actuator of the linear actuators. The system may also include a platform coupled to a longitudinal end of each of the pairs of parallel rods opposite the respective linear actuator.

Embodiments of the present disclosure may also include one or more of the following features. The system where the support frame includes: a first base member extending in a horizontal direction and configured to rest against a surface upon which the system is disposed; a support member attached to the first base member and extending upward from the first base member in a vertical direction; and cross members attached to the support member and extending in horizontal directions above the first base member. The system where the first base member includes a rail have a general L-shaped cross-section and a short leg of an L-shape and a long leg of the L-shape, where the long leg of the L-shape is configured to rest against the surface upon which the system is disposed. The system where the support frame further includes wheels mounted to the short leg of the first base member. The system where the support frame further includes: a second base member rotatably coupled to the support member. The system may also include at least one additional wheel mounted to a bottom surface of the second base member. The system where the support frame further includes a brace member rotatably coupled to the support member at a location above the second base member and engageable with a upper surface of the second base member. The system where the support frame further includes a handle member formed at a top of the support member. The system where the linear actuators include: two outer linear actuators coupled to outer rails of the rails. The system may also include a center linear actuator coupled to a center rail of the rails disposed between the outer rails of the rails. The system further including: a pair of outer cantilever rails coupled to respective linear actuators of the linear actuators. The system may also include a center cantilever rail coupled to a center linear actuator of the linear actuators, where the pairs of parallel rods are operably coupled to the pair of outer cantilever rails and the center cantilever rail via linear carriages. The system where the rails include at least six rails.

One or more embodiments of the present disclosure may include a system, including: a support frame. The system may also include rails mounted to the support frame; extension assemblies, each extension assembly coupled to a respective rail of the rails and configured to translate along a longitudinal length of the respective rail, where each extension assembly includes:. The system may also include an upper linear bearing movably coupled to a rail of the rails via a linear actuator. The system may also include an extension rail coupled to the upper linear bearing. The system may also include cantilever rails coupled to longitudinal ends of the extension rails of the extension assemblies; pairs of parallel rods each operably coupled to a respective cantilever rail of the cantilever rails, and a platform coupled to a longitudinal end of each of the pairs of parallel rods opposite the respective cantilever rail.

Embodiments of the present disclosure may also include one or more of the following features. The system where the cantilever rails include: two outer cantilever rails coupled to outer rails of the rails; and a center cantilever rail coupled to a center rail of the rails disposed between the outer rails of the rails. The system where each of the cantilever rails is coupled to a respective extension rail via a hinge member and is rotatable relative to the respective extension rail. The system further including linear carriages coupling the pairs of parallel rods to the cantilever rails and translatable along longitudinal lengths of the cantilever rails. The system where the support frame includes: a first base member extending in a horizontal direction and configured to rest against a surface upon which the system is disposed; a support member attached to the first base member and extending upward from the first base member in a vertical direction; and cross member attached to the support member and extending in horizontal directions above the first base member. The system where the first base member includes a rail have a general l-shaped cross-section and a short leg of an l-shape and a long leg of the l-shape, where the long leg of the l-shape is configured to rest against the surface upon which the system is disposed. The system where the support frame further includes a wheels mounted to the short leg of the first base member. The system where the support frame further includes: a second base member rotatably coupled to the support member. The system may also include at least one additional wheel mounted to a bottom surface of the second base member.

One or more embodiments of the present disclosure may include a method of forming a system, the method including: mounting rails to a support frame, the rails having longitudinal axes that are parallel to each other and lying within a common plane; coupling a linear actuator to each of the rails; coupling a pair of parallel rods to each linear actuator; and coupling a platform to the pairs of parallel rods.

Embodiments of the present disclosure may also include one or more of the following features. The method further including forming the support frame including: attaching a support member to a first base member such that the first base member extends in at least substantially a horizontal direction and the support member extends in at least substantially a vertical direction; rotatably coupling a second base member to the support member at a location above the first base member; mounting cross members to the support member at locations above the first base member and the second base member, the cross members extending in horizontal directions; and mounting at least one wheel to each of the first base member and the second base member.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and legal equivalents.

What is claimed is:

1. A system, comprising:
    a support frame comprising:
        a first base member extending in a horizontal direction and configured to rest against a surface upon which the system is disposed, the first base member comprising a first rail having a general L-shaped cross-section and a short leg of an L-shape and a long leg of the L-shape, wherein the long leg of the L-shape is configured to rest against the surface upon which the system is disposed,
        a support member attached to the first base member and extending upward from the first base member in a vertical direction; and
        cross members attached to the support member and extending in horizontal directions above the first base member;
    rails mounted to the support frame, wherein longitudinal axes of the rails are oriented parallel to each other and lie within a common plane;
    linear actuators, each linear actuator coupled to a respective rail of the rails and configured to translate along a longitudinal length of the respective rail;
    pairs of parallel rods each operably coupled to a respective linear actuator of the linear actuators; and
    a platform coupled to a longitudinal end of each of the pairs of parallel rods opposite the respective linear actuator.

2. The system of claim 1, wherein the support frame further comprises wheels mounted to the short leg of the first base member.

3. The system of claim 2, wherein the support frame further comprises:
    a second base member rotatably coupled to the support member; and
    at least one additional wheel mounted to a bottom surface of the second base member.

4. The system of claim 3, wherein the support frame further comprises a brace member rotatably coupled to the support member at a location above the second base member and engageable with a upper surface of the second base member.

5. The system of claim 1, wherein the support frame further comprises a handle member formed at a top of the support member.

6. The system of claim 1, wherein the linear actuators comprise:
   two outer linear actuators coupled to outer rails of the rails; and
   a center linear actuator coupled to a center rail of the rails disposed between the outer rails of the rails.

7. The system of claim 1, further comprising:
   a pair of outer cantilever rails coupled to respective linear actuators of the linear actuators; and
   a center cantilever rail coupled to a center linear actuator of the linear actuators, wherein the pairs of parallel rods are operably coupled to the pair of outer cantilever rails and the center cantilever rail via linear carriages.

8. A system, comprising:
   a support frame;
   rails mounted to the support frame;
   extension assemblies, each extension assembly coupled to a respective rail of the rails and configured to translate along a longitudinal length of the respective rail, wherein each extension assembly comprises:
      an upper linear bearing movably coupled to a rail of the rails via a linear actuator; and
      an extension rail coupled to the upper linear bearing; and
   cantilever rails coupled to longitudinal ends of the extension rails of the extension assemblies;
   pairs of parallel rods each operably coupled to a respective cantilever rail of the cantilever rails; and
   a platform coupled to a longitudinal end of each of the pairs of parallel rods opposite the respective cantilever rail.

9. The system of claim 8, wherein the cantilever rails comprise:
   two outer cantilever rails coupled to outer rails of the rails; and
   a center cantilever rail coupled to a center rail of the rails disposed between the outer rails of the rails.

10. The system of claim 9, wherein each of the cantilever rails is coupled to a respective extension rail via a hinge member and is rotatable relative to the respective extension rail.

11. The system of claim 8, further comprising linear carriages coupling the pairs of parallel rods to the cantilever rails and translatable along longitudinal lengths of the cantilever rails.

12. The system of claim 8, wherein the support frame comprises:
   a first base member extending in a horizontal direction and configured to rest against a surface upon which the system is disposed;
   a support member attached to the first base member and extending upward from the first base member in a vertical direction; and
   cross member attached to the support member and extending in horizontal directions above the first base member.

13. The system of claim 12, wherein the first base member comprises a first rail have a general L-shaped cross-section and a short leg of an L-shape and a long leg of the L-shape, wherein the long leg of the L-shape is configured to rest against the surface upon which the system is disposed.

14. The system of claim 13, wherein the support frame further comprises s-wheels mounted to the short leg of the first base member.

15. The system of claim 14, wherein the support frame further comprises:
   a second base member rotatably coupled to the support member; and
   at least one additional wheel mounted to a bottom surface of the second base member.

16. A method of forming a system, the method comprising:
   forming a support frame, comprising:
      attaching a support member to a first base member such that the first base member extends in at least substantially a horizontal direction and the support member extends in at least substantially a vertical direction;
      rotatably coupling a second base member to the support member at a location above the first base member;
      mounting cross members to the support member at locations above the first base member and the second base member, the cross members extending in horizontal directions; and
      mounting at least one wheel to each of the first base member and the second base member
   mounting rails to a support frame, the rails being oriented next to each other in a line and facing a common axis;
   coupling a linear actuator to each of the rails;
   coupling a pair of parallel rods to each linear actuator; and
   coupling a platform to the pairs of parallel rods.

* * * * *

UNITED STATES PATENT AND TRADEMARK OFFICE
CERTIFICATE OF CORRECTION

PATENT NO. : 10,906,172 B2  
APPLICATION NO. : 16/191135  
DATED : February 2, 2021  
INVENTOR(S) : Anthony L. Crawford Page 1 of 1

It is certified that error appears in the above-identified patent and that said Letters Patent is hereby corrected as shown below:

In the Specification

| | | | |
|---|---|---|---|
| | Column 4, | Line 23, | change "reference numberal" to --reference numeral-- |
| | Column 4, | Line 25, | change "reference numberal 108)," to --reference numeral 106)-- |
| | Column 4, | Line 26, | change "108*c*, a controller" to --108*c* (referred to collectively with the reference numeral 108),-- |

In the Claims

| | | | |
|---|---|---|---|
| Claim 14, | Column 24, | Line 19, | change "comprises s-wheels" to --comprises wheels-- |

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*